(12) United States Patent
Abolhasani et al.

(10) Patent No.: US 11,499,948 B2
(45) Date of Patent: Nov. 15, 2022

(54) DEVICES AND METHODS OF USE THEREOF

(71) Applicant: NORTH CAROLINA STATE UNIVERSITY, Raleigh, NC (US)

(72) Inventors: Milad Abolhasani, Raleigh, NC (US); Robert W. Epps, Raleigh, NC (US); Kobi C. Felton, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 218 days.

(21) Appl. No.: 16/646,248

(22) PCT Filed: Sep. 11, 2018

(86) PCT No.: PCT/US2018/050324
§ 371 (c)(1),
(2) Date: Mar. 11, 2020

(87) PCT Pub. No.: WO2019/055360
PCT Pub. Date: Mar. 21, 2019

(65) Prior Publication Data
US 2020/0209201 A1 Jul. 2, 2020

Related U.S. Application Data

(60) Provisional application No. 62/558,155, filed on Sep. 13, 2017.

(51) Int. Cl.
*G01N 30/60* (2006.01)
*G01N 30/24* (2006.01)
(Continued)

(52) U.S. Cl.
CPC ......... *G01N 30/6095* (2013.01); *G01N 30/24* (2013.01); *G01N 30/30* (2013.01); *G01N 30/66* (2013.01)

(58) Field of Classification Search
None
See application file for complete search history.

(56) References Cited

U.S. PATENT DOCUMENTS

| | | | |
|---|---|---|---|
| 7,316,967 B2 | 1/2008 | Yen et al. | |
| 8,101,021 B2 | 1/2012 | Yen et al. | |

(Continued)

FOREIGN PATENT DOCUMENTS

| | | |
|---|---|---|
| WO | 2010/088514 A1 | 8/2010 |
| WO | 2017115144 | 7/2017 |

OTHER PUBLICATIONS

Abolhasani M et al. "Oscillatory Microprocessor for Growth and in Situ Characterization of Semiconductor Nanocrystals," Chem. Mater., 2015, 27, 6131-6138.

(Continued)

*Primary Examiner* — Paul M. West
*Assistant Examiner* — Mark A Shabman
(74) *Attorney, Agent, or Firm* — Meunier Carlin & Curfman LLC

(57) ABSTRACT

Described herein are devices and methods of use thereof, the devices comprising: a sample conduit providing a path for fluid flow extending from a sample inlet to a sample outlet; a thermal housing enclosing the sample conduit, the thermal housing comprising a plurality of measurement regions; and a motorized stage translatable along the thermal housing so as to align a detector with one or more of the plurality of measurement regions. The devices can continuously flow a fluid precursor sample from the sample inlet to the sample outlet, the fluid precursor sample comprising a first precursor and a second precursor, such that the first precursor reacts with the second precursor as the fluid precursor sample continuously flows from the sample inlet to the sample outlet to form the sample before reaching the sample (Continued)

outlet, wherein the sample comprises a plurality of particles or an organic molecule.

20 Claims, 24 Drawing Sheets

(51) Int. Cl.
G01N 30/30 (2006.01)
G01N 30/66 (2006.01)

(56) References Cited

U.S. PATENT DOCUMENTS

| | | | |
|---|---|---|---|
| 2002/0129662 A1 | 9/2002 | Gysling et al. | |
| 2003/0148526 A1 | 8/2003 | Schulz | |
| 2003/0203502 A1 | 10/2003 | Zenhausern et al. | |
| 2007/0039866 A1 | 2/2007 | Schroeder et al. | |
| 2010/0315628 A1 | 12/2010 | Mertsching et al. | |
| 2012/0122705 A1 | 5/2012 | Ting et al. | |
| 2012/0135511 A1* | 5/2012 | Battrell | G01N 21/6456 435/287.2 |
| 2012/0153188 A1 | 6/2012 | Barrett | |
| 2016/0375495 A9 | 12/2016 | Schut et al. | |
| 2017/0043313 A1* | 2/2017 | Abolhasani | B01J 19/0093 |
| 2017/0189879 A1 | 7/2017 | Simsek et al. | |

OTHER PUBLICATIONS

Al-Rawashdeh M et al. "Phenylacetylene Hydrogenation over [Rh(NBD)(PPh3)2]BF4 Catalyst in a Numbered-Up Microchannels Reactor," Ind. Eng. Chem. Res., 2013, 52, 11516-11526.
Baena JPC et al. "Highly efficient planar perovskite solar cells though band alignment engineering," Energy Environ Sci, 2015, 8, 2928-2934.
Chan EM et al. "Size-Controlled Groth of CdSe Nanocrystals in Microfluidic Reactors," Nano Lett., 2003, 3, 199-201.
Donega C. "Synthesis and properties of colloidal heteronanocrystals," Chem Soc, Rev, 2011, 40, 1512-1546.
Günther A et al. "Micromixing of Miscible Liquids in Segmented Gas-Liquid Flow," Langmuir, 2005, 21, 1547-1555.
Hartman RL et al. "Deciding Whether to Go with the Flow: Evaluating the Merits of Flow Reactors for Synthesis," Angew. Chemie Int. Ed., 2011, 50, 7502-7519.
Hou et al. "Synthesis and Stabilization of Colloidal Perovskite Nanocrystals by Multidentate Polymer Micelles," ACS Appl. Mater. Interfaces, 2017, 9(22), 18417-18422.
Il Park J et al. "Microfluidic Synthesis of Polymer and Inorganic Particulate Materials," Annu. Rev. Mater. Res., 2010, 40, 415-443.
Jasieniak J et al. "Re-examination of the size-dependent absorption properties of CdSe quantum dots," J. Phys. Chem. C, 2009, 113, 19468-19474.
Khan SA et al. "Microfluidic synthesis of colloidal silica," Langmuir, 2004, 20, 8604-8611.
Kim HS et al. "Lead Iodide Perovskite Sensitized All-Solid-State Submicron Thin Film Mesoscopic Solar Cell with Efficiency Exceeding 9%,", Sci Rep, 2012, 2, 591.
Kojima A et al. "Organometal halide perovskites as visible-light sensitizers for photovoltaic cells," JACS, 2009, 131, 6050-6051.
Krishnadasan S et al. "On-line analysis of CdSe nanoparticle formation in a continuous flow chip-based microreactor," J. Mater. Chem., 2004, 14, 2655-2660.
Leung SA et al. "A method for rapid reaction optimisation in continuous-flow microfluidic reactors using online Raman spectroscopic detection," Analyst, 2005, 130, 46-51.
Li G et al. "Shape and phase evolution from CsPbBr 3 perovskite nanocubes to tetragonal CsPb 2 Br 5 nanosheets with an indirect bandgap," Chem. Commun., 2016, 52, 11296-11299.
Lignos I et al. "Facile droplet-based microfluidic synthesis of monodisperse IV-VI semiconductor nanocrystals with coupled in-line NIR fluorescence detection," Chem. Mater., 2014, 26, 2975-2982.

Lignos I et al. "Synthesis of cesium lead halide perovskite nanocrystals in a droplet-based microfluidic platform: fast parametric space mapping," Nano Lett., 2016, 16, 1869-1877.
Lignos I et al. "Millisecond-Timescale Monitoring of PbS Nanoparticle Nucleation and Growth Using Droplet-Based Microfluidics," Small, 2015, 11, 4009-4017.
Liu D et al. "Perovskite solar cells with a planar heterojunction structure prepared using room-temperature solution processing techniques," Nat Photon, 2014, 8, 133-138.
Marre S et al. "Synthesis of micro and nanostructures in microfluidic systems," Chem. Soc. Rev., 2010, 39, 1183-1202.
Murray CB et al. "Synthesis and characterization of monodisperse nanocrystals and close-packed nanocrystal assemblies," Annu. Rev. Mater. Sci., 2000, 30, 545-610.
Murray CB et al. "Synthesis and characterization of nearly monodisperse CdE (E=sulfur, selenium, tellurium) semiconductor nanocrystallites," J. Am. Chem. Soc., 1993, 115, 8706-8715.
Nedelcu G et al. et al. "Fast Anion-Exchange in Highly Luminescent Nanocrystals of Cesium Lead Halide Perovskites (CsPbX3, X=Cl, Br, I)," Nano Lett, 2015, 15, 5635-5640.
Nieves-Remacha MJ et al. "Hydrodynamics of liquid-liquid dispersion in an advanced-flow reactor," Ind. Eng. Chem. Res., 2012, 51, 16251-16262.
Nightingale AM et al. "Controlled synthesis of III-V quantum dots in microfluidic reactors," ChemPhysChem, 2009, 10, 2612-2614.
Nightingale AM et al. "Large-scale synthesis of nanocrystals in a multichannel droplet reactor," J. Mater. Chem. A, 2013, 1, 4067-4076.
Nightingale AM et al. "Controlled multistep synthesis in a three-phase droplet reactor," Nat. Commun., 2014, 5, 3777.
Niu G et al. "Toward continuous and scalable production of colloidal nanocrystals by switching from batch to droplet reactors," Chem. Soc. Rev., 2015, 44, 5806-5820.
Pan J et al. "Automated synthesis of photovoltaic-quality colloidal quantum dots using separate nucleation and growth stages," ACS Nano, 2013, 7, 10158-10166.
Phillips TW et al. "Nanocrystal synthesis in microfluidic reactors: where next?," Lab on a Chip, 2014, 14, 3172-3180.
Protesescu L et al. "Monodisperse formamidinium lead bromide nanocrystals with bright and stable green photoluminescence," J. Am. Chem. Soc., 2016, 138, 14202-14205.
Protesescu L. "Nanocrystals of Cesium Lead Halide Perovskites (CsPbX3, X=Cl, Br, and I): Novel Optoelectronic Materials Showing Bright Emission with Wide Color Gamut," Nano Lett., 2015, 15, 3692-3696.
Saliba M et al. "Cesium-containing triple cation perovskite solar cells: improved stability, reproducibility and high efficiency," Energy & Environmental Science, 2016, 9, 1989-1997.
Sun S et al. "Ligand-Mediated Synthesis of Shape-Controlled Cesium Lead Halide Perovskite Nanocrystals via Reprecipitation Process at Room Temperature," ACS Nano, 2016, 10, 3648-3657.
Tice JD et al. "Formation of droplets and mixing in multiphase microfluidics at low values of the Reynolds and the capillary numbers," Langmuir, 2003, 19, 9127-9133.
Toyota A et al. "Combinatorial synthesis of CdSe nanoparticles using microreactors," J. Phys. Chem. C, 2010, 114, 7527-7534.
Wang H et al. "Highly luminescent CdSe/ZnS nanocrystals synthesized using a single-molecular ZnS source in a microfluidic reactor," Adv. Funct. Mater., 2005, 15, 603-608.
Wei S et al. "Room-temperature and gram-scale synthesis of CsPbX 3 (X=Cl, Br, I) perovskite nanocrystals with 50-85% photoluminescence quantum yields," Chem. Commun., 2016, 52, 7265-7268.
Yakunin S et al. "Low-threshold amplified spontaneous emission and lasing from colloidal nanocrystals of caesium lead halide perovskites," Nat Comm, 2015, 6, 8056.
Yap SK et al. "Three-phase microfluidic reactor networks—Design, modeling and application to scaled-out nanoparticle-catalyzed hydrogenations with online catalyst recovery and recycle," Chem. Eng. Sci., 2017, 169, 117-127.
Yassitepe E et al. "Amine-free synthesis of cesium lead halide perovskite quantum dots for efficient light-emitting diodes," Adv. Funct. Mater., 2016, 26, 8757-8763.

(56) References Cited

OTHER PUBLICATIONS

Yen BKH et al. "A microfabricated gas-liquid segmented flow reactor for high-temperature synthesis: the case of CdSe quantum dots," Angew. Chemie, 2005, 117, 5583-5587.
Yu WW et al. "Experimental determination of the extinction coefficient of CdTe, CdSe, and CdS nanocrystals," Chem. Mater., 2003, 15, 2854-2860.
Zhang J et al. "Design and scaling up of microchemical systems: a review," Annu. Rev. Chem. Biomol. Eng., 2017, 8, 285-305.
Zhang L et al. "Scaling up the production of colloidal nanocrystals: Should we increase or decrease the reaction volume?" Adv. Mater., 2014, 26, 2600-2606.
International Search Report and Written Opinion in corresponding application No. PCT/US2018/050324, dated Nov. 15, 2018, 9 pages.

\* cited by examiner

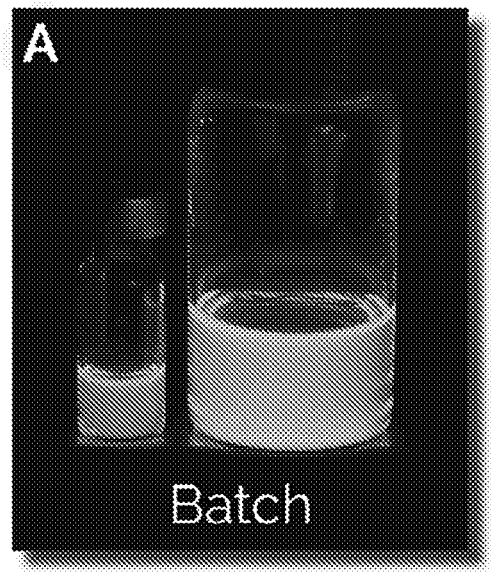 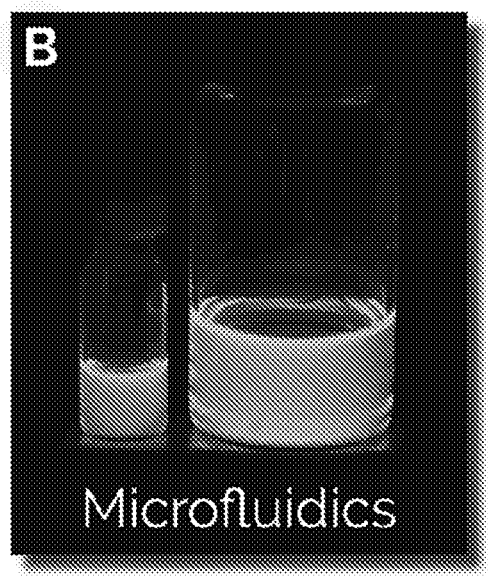
*Figure 14A*     *Figure 14B*
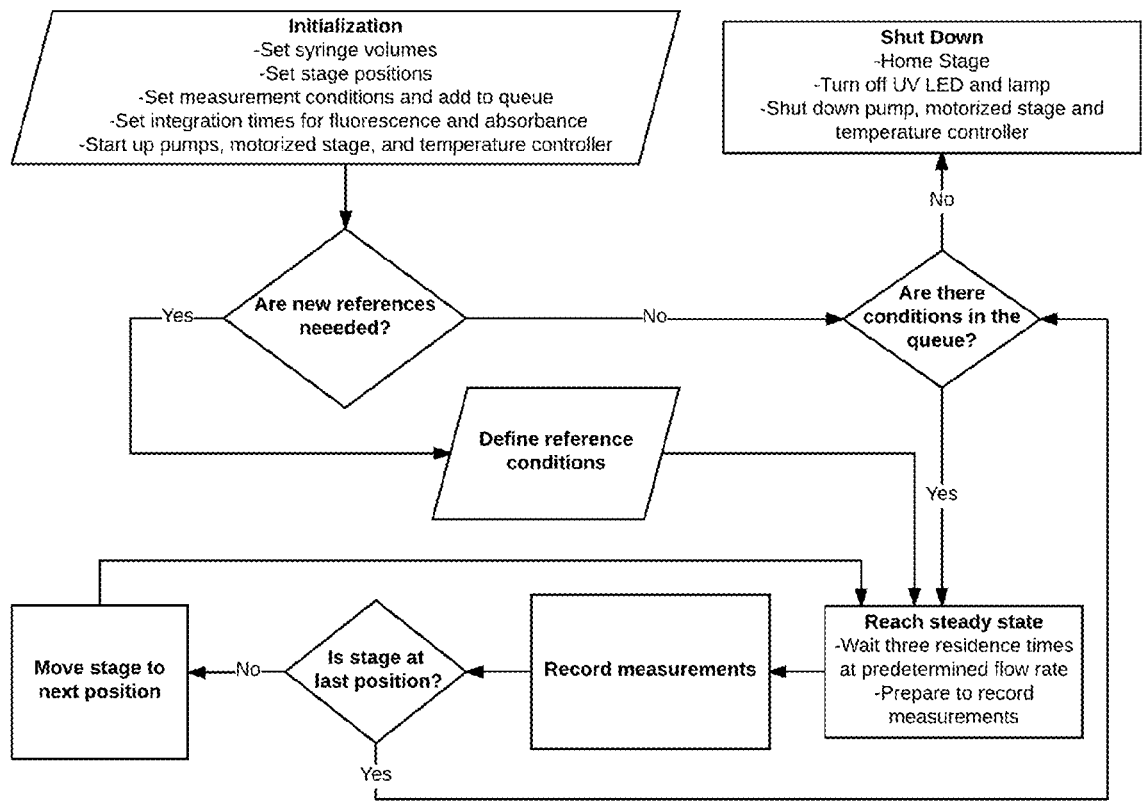
*Figure 15*

DEVICES AND METHODS OF USE THEREOF

CROSS-REFERENCE TO RELATED APPLICATIONS

This is a national phase application of PCT International Application No. PCT/US2018/050324, filed Sep. 11, 2018, which claims the benefit of priority to U.S. Provisional Application No. 62/558,155, filed Sep. 13, 2017, each of which is hereby fully incorporated herein by reference in its entirety.

BACKGROUND

Although conventional flask-based strategies have been the main driving force for the discovery and studies of nanomaterials, approaching characterization, screening, and optimization of nanomaterials with a manual batch system presents inherent limitations in sampling rate, reagent volume, and analysis time. Furthermore, scale-up from batch synthesis for large-scale manufacturing of high-quality nanomaterials often amplifies existing mixing inefficiencies and well-known batch-to-batch variation that can further affect the resulting products through variable and unfavorable heat and mass transfer kinetics. The devices and methods described herein address these and other needs

SUMMARY

In accordance with the purposes of the disclosed devices and methods, as embodied and broadly described herein, the disclosed subject matter relates to devices and methods of use thereof.

Additional advantages of the disclosed devices and methods will be set forth in part in the description which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

(FIG. 8A) Schematic illustration of the automated and modular microfluidic platform with the three-port translational flow cell and the optional extension module. (FIG. 8B) Schematic of the T-junction for the single-phase flow and (FIG. 8C) the four-way junction for the multi-phase flow format implementing a Y-junction plug formation.

(FIG. 10A) Fluorescence image of gas-liquid segmented flow under UV illumination and the corresponding, continuously collected (FIG. 10B) photoluminescence (PL) and (FIG. 10C) absorption spectra at one of the sampling ports along the microreactor shown in FIG. 8A. Gas phase: pressurized nitrogen (10 psig) at $Q_G=278$ µL/min; liquid phase: toluene containing perovskite quantum dots at $Q_L=185$ µL/min. Integration times of 4 ms and 15 ms were used for photoluminescence and absorption spectra shown in graphs in FIG. 10B and FIG. 10C, respectively. Scale bar is 1 mm.

(FIG. 12A) In-situ obtained photoluminescence and absorption spectra of $CsPbBr_3$ quantum dots for single (light) and multi-phase (dark) flow formats at a 27.6 cm reactor length with the change in photoluminescence peak wavelength across three different average fluid velocities. Note that the measured absorption spectra at 44 mm/s were below the detection limit of the photo spectrometer (<0.05 a.u.). Photoluminescence peak wavelength time-evolution as a function of residence time over varying average fluid velocities for (FIG. 12B) single and (FIG. 12C) multi-phase flow systems. All spectra were collected across the full modular reactor without extension units. Integration times of 4 ms and 15 ms were used for the obtained photoluminescence and absorption spectra, respectively.

FIG. 14A-FIG. 14B: (FIG. 14A) Demonstration of batch CsPbBr$_3$ quantum dot synthesis variability within 2 mL and 20 mL vials compared with (FIG. 14B) an equivalent volume of multi-phase microfluidic products under UV illumination.

FIG. 15: Process logic flow chart for the automated sampling system, run through LabVIEW Virtual Interfaces (VI's). The initialization block also includes an optional eight passes of the translational stage for stabilization followed by the port detection and alignment.

(FIG. 16A) Raw spectral data normalized on the highest measured intensity for the Deuterium-Tungsten light source at 500 nm across all ports and (FIG. 16B) scaled by port over 30 full reactor length passes of the translating flow cell. (FIG. 16C) Raw spectral data normalized on the highest measured intensity for the 400 nm LED at 400 nm across all ports and (FIG. 16D) scaled by port over 30 full reactor length passes of the translating flow cell. Toluene was used as the working fluid within the Teflon microreactor. Error bars indicate a 95% confidence interval.

(FIG. 26A) A schematic of a quantum dot synthesis platform integrated with (FIG. 26B) a machine learning algorithm for autonomous discovery, screening, and optimization of quantum dots.

(FIG. 28A) Illustration of anion exchange reactions of perovskite quantum dots. Regression plots of the developed feed forward neural network using 800 experimental data after (FIG. 28B) training and (FIG. 28C) testing with 15 hidden layers. FIG. 28D is a regression plot of the developed neural network validated against 130 "new" anion exchange reactions.

DETAILED DESCRIPTION

Figure 1:
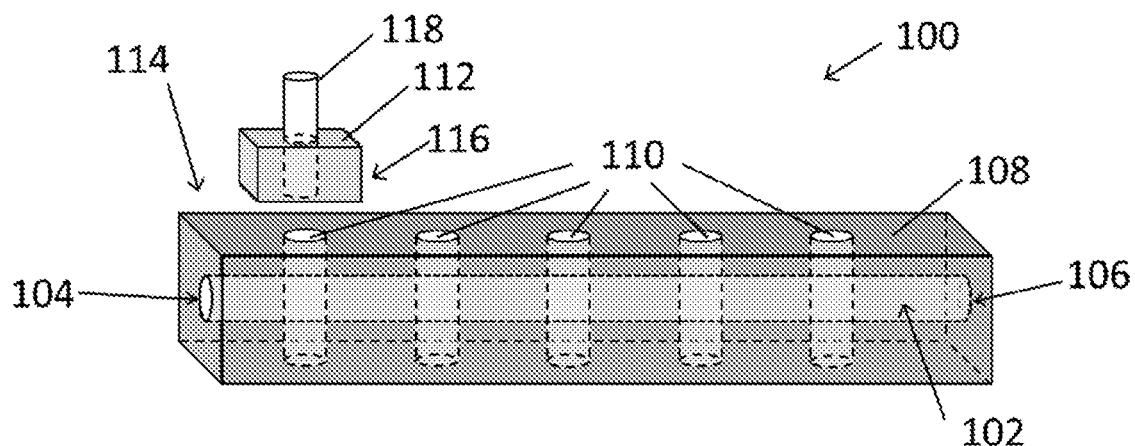
FIG. 1 is a schematic of an exemplary device as disclosed herein.

The compositions and methods described herein may be understood more readily by reference to the following detailed description of specific aspects of the disclosed subject matter and the Examples included therein.

Before the present devices and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are modular microfluidic reactors for the synthesis of samples and methods of use thereof. Referring now to FIG. 1, disclosed herein are devices 100 comprising: a sample conduit 102 providing a path for fluid flow extending from a sample inlet 104 to a sample outlet 106; a thermal housing 108 enclosing the sample conduit 102, wherein the thermal housing 108 comprises a plurality of measurement regions 110; a detector 118 configured to capture a spectroscopic signal from the sample conduit 102 at one or more of the plurality of measurement regions 110; and a motorized stage 112 translatable along the thermal housing 108 from a first location 114 to a second location 116, wherein the detector 118 is coupled to the motorized stage 112 such that the motorized stage 112 is configured to translate the detector 118 along the thermal housing 108 align the detector 118 with one or more of the plurality of measurement regions 110. As used herein, "aligning" a detector with one or more of the plurality of measurement regions means that the detector can spectroscopically interrogate a fluid sample present within the sample conduit.

The sample conduit 102 can have any suitable shape. In some examples, the sample conduit 102 can have a substantially circular cross-section. The sample conduit 102 can comprise any suitable material. In some examples, the sample conduit 102 can comprise teflon tubing.

In certain examples, the sample conduit 102 can have an inner diameter of 0.01 inches or more (e.g., 0.02 inches or more, 0.03 inches or more, 0.04 inches or more, 0.05 inches or more, 0.06 inches or more, 0.07 inches or more, or 0.08 inches or more). In some examples, the sample conduit 102 can have an inner diameter of 0.1 inches or less (e.g., 0.09 inches or less, 0.08 inches or less, 0.07 inches or less, 0.06 inches or less, 0.05 inches or less, 0.04 inches or less, or 0.03 inches or less). The inner diameter of the sample conduit 102 can range from any of the minimum values described above to any of the maximum values described above. For example, the sample conduit 102 can have an inner diameter of from 0.01 inches to 0.1 inches (e.g., from 0.01 inches to 0.05 inches, from 0.05 inches to 0.1 inches, from 0.01 inches to 0.03 inches, from 0.03 inches to 0.06 inches, from 0.06 inches to 0.1 inches, or from 0.02 inches to 0.09 inches).

In certain examples, the sample conduit 102 can have an outer diameter of 0.0625 inches or more (e.g., 0.065 inches or more, 0.0675 inches or more, 0.07 inches or more, 0.0725 inches or more, 0.075 inches or more, 0.0775 inches or more, 0.08 inches or more, 0.0825 inches or more, 0.085 inches or more, 0.0875 inches or more, 0.09 inches or more, 0.0925 inches or more, 0.095 inches or more, 0.0975 inches or more, 0.1 inches or more, 0.1025 inches or more, 0.105 inches or more, 0.1075 inches or more, 0.11 inches or more, 0.1125 inches or more, 0.1150 inches or more, 0.1175 inches or more, or 0.12 inches or more). In some examples, the sample conduit 102 can have an outer diameter of 0.125 inches or less (e.g., 0.1225 inches or less, 0.12 inches or less, 0.1175 inches or less, 0.115 inches or less, 0.1125 inches or less, 0.11 inches or less, 0.1075 inches or less, 0.105 inches or less, 0.1025 inches or less, 0.1 inches or less, 0.0975 inches or less, 0.095 inches or less, 0.0925 inches or less, 0.09 inches or less, 0.0875 inches or less, 0.085 inches or less, 0.0825 inches or less, 0.08 inches or less, 0.0775 inches or less, 0.075 inches or less, 0.0725 inches or less, 0.07 inches or less, or 0.0675 inches or less). The outer diameter of the sample conduit 102 can range from any of the minimum values described above to any of the maximum values described above. For example, the sample conduit 102 can have an outer diameter of from 0.0625 inches to 0.125 inches (e.g., from 0.0625 inches to 0.0925 inches, from 0.0925 inches to 0.125 inches, from 0.0625 inches to 0.075 inches, from 0.075 inches to 0.0875 inches, from 0.0875 inches to 0.1 inches, from 0.1 inches to 0.1125 inches, from 0.1125 inches to 0.125 inches, or from 0.075 inches to 0.1 inches).

Figure 2:
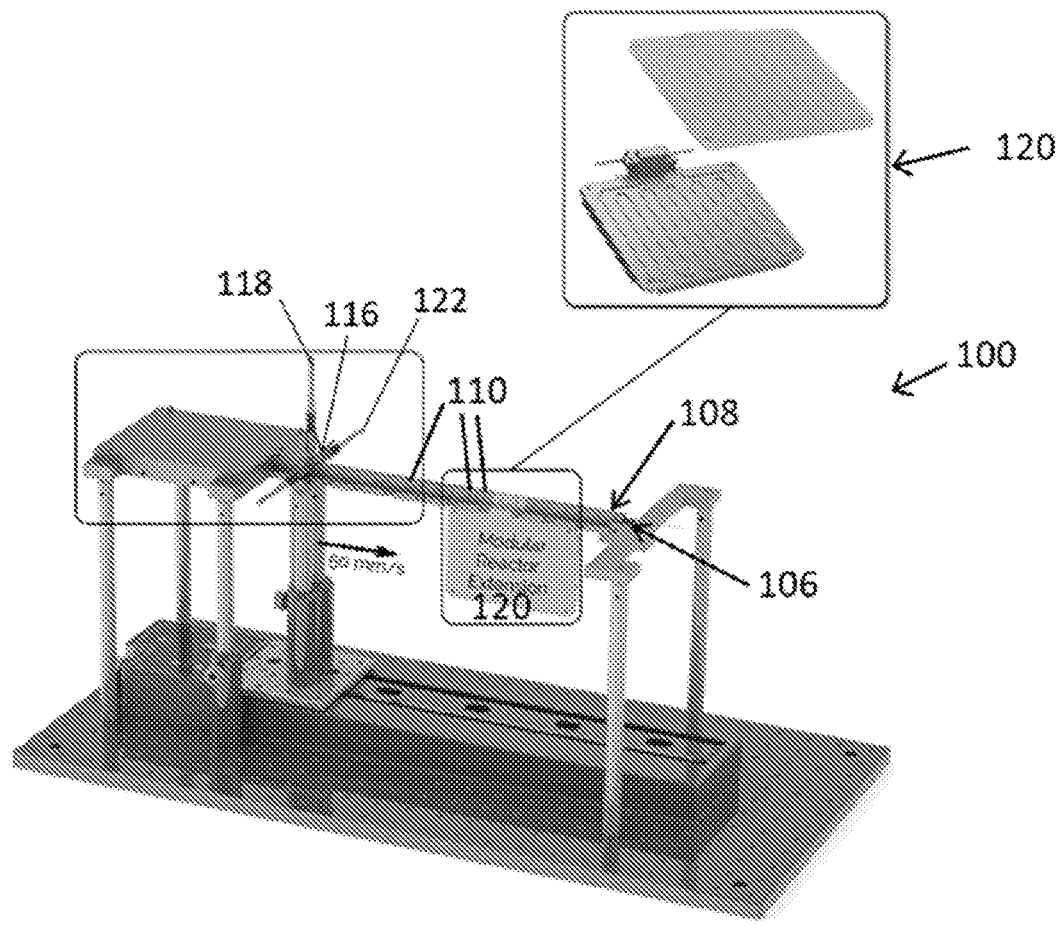
FIG. 2 is a schematic of an exemplary device as disclosed herein.

The length of the sample conduit 102 from the sample inlet 104 to the sample outlet 106 can be selected, in some examples, based on the desired characteristic of the sample. For example, the length of the sample conduit 102 from the sample inlet 104 to the sample outlet 106 can be 1 centimeter (cm) or more (e.g., 2 cm or more, 3 cm or more, 4 cm or more, 5 cm or more, 10 cm or more, 15 cm or more, 20 cm or more, 25 cm or more, 50 cm or more, 75 cm or more, 100 cm or more, 125 cm or more, 150 cm or more, 175 cm or more, 200 cm or more, 225 cm or more, 250 cm or more, 275 cm or more, 300 cm or more, 325 cm or more, 350 cm or more, 375 cm or more, 400 cm or more, 425 cm or more, or 450 cm or more). In some examples, the length of the sample conduit 102 from the sample inlet 104 to the sample outlet 106 can be 500 cm or less (e.g., 475 cm or less, 450 cm or less, 425 cm or less, 400 cm or less, 375 cm or less, 350 cm or less, 325 cm or less, 300 cm or less, 275 cm or less, 250 cm or less, 225 cm or less, 200 cm or less, 175 cm or less, 150 cm or less, 125 cm or less, 100 cm or less, 75 cm or less, 50 cm or less, 25 cm or less, 20 cm or less, 15 cm or less, 10 cm or less, or 5 cm or less). The length of the sample conduit 102 from the sample inlet 104 to the sample outlet 106 can range from any of the minimum values described above to any of the maximum values described above. For example, the length of the sample conduit 102 from the sample inlet 104 to the sample outlet 106 can be from 1 cm to 500 cm (e.g., from 1 cm to 250 cm, from 250 cm to 500 cm, from 1 cm to 100 cm, from 100 cm to 200 cm, from 200 cm to 300 cm, from 300 cm to 400 cm, from 400 cm to 500 cm, from 50 cm to 450 cm, or from 3 cm to 196 cm). Referring now to FIG. 2, in some examples, the sample conduit 102 can comprise one or more modules 120, wherein each of the one or more modules 120 comprises a fluid flow path of a predetermined length such that the sample conduit 102 can be configured to have a path for fluid flow of a desired length by fluidly connecting one or more modules.

The thermal housing 108 can comprise any suitable thermally conductive material. In some examples, the thermal housing 108 can comprise a metal (e.g., aluminum).

The plurality of measurement regions 110 can, for example, be substantially spectroscopically transparent. As used herein, "substantially spectroscopically transparent" is meant to include any material that is substantially transparent at the wavelength or wavelength region of interest. The plurality of measurement regions 110 can, for example, comprise a plurality of voids, a plurality of windows comprising a substantially spectroscopically transparent material, or a combination thereof. The substantially spectroscopically transparent material can comprise glass, quartz, silicon dioxide, a polymer, or a combination thereof.

The devices 100 can, for example, further comprise a light source 122. The light source can be any type of light source. Examples of suitable light sources include natural light sources (e.g., sunlight) and artificial light sources (e.g., incandescent light bulbs, light emitting diodes, gas discharge lamps, arc lamps, lasers etc.). In some examples, the light source 122 can comprise an incandescent light bulb, a light emitting diode, a gas discharge lamp, an arc lamp, a laser, or a combination thereof. In certain examples, the light source comprises a light emitting diode, a halogen lamp, a tungsten lamp, or a combination thereof.

The device 100 include the light source 122 can be configured such that the light source 122 is configured to illuminate the sample conduit 102 at one or more of the plurality of measurement regions 110. In some examples, the light source 122 can be coupled to the motorized stage 112 such that the motorized stage 112 is configured to translate the light source 122 along the thermal housing 108.

The detector 118 can comprise, for example, a camera, an optical microscope, an electron microscope, a spectrometer, or combinations thereof. In some examples, the detector 118 comprises a spectrometer. Examples of spectrometers include, but are not limited to, Raman spectrometers, UV-vis absorption spectrometers, IR absorption spectrometers, fluorescence spectrometers, and combinations thereof.

In certain examples, the device can further comprise a three port cell coupled the motorized stage, wherein the three port cell can hold one or more detectors and one or more light sources. In certain examples, the light source can comprise an LED light source and the detector can comprise a fluorescence spectrometer, wherein the device is configured such that the LED light source and the fluorescence spectrometer are aligned perpendicular to one another with respect to the measurement region. In certain examples, the light source can comprise a broadband light source and the detector can comprise an absorption spectrometer, wherein the device is configured such that the broadband light source is in-line with the absorption spectrometer with respect to the measurement region.

Figure 3:
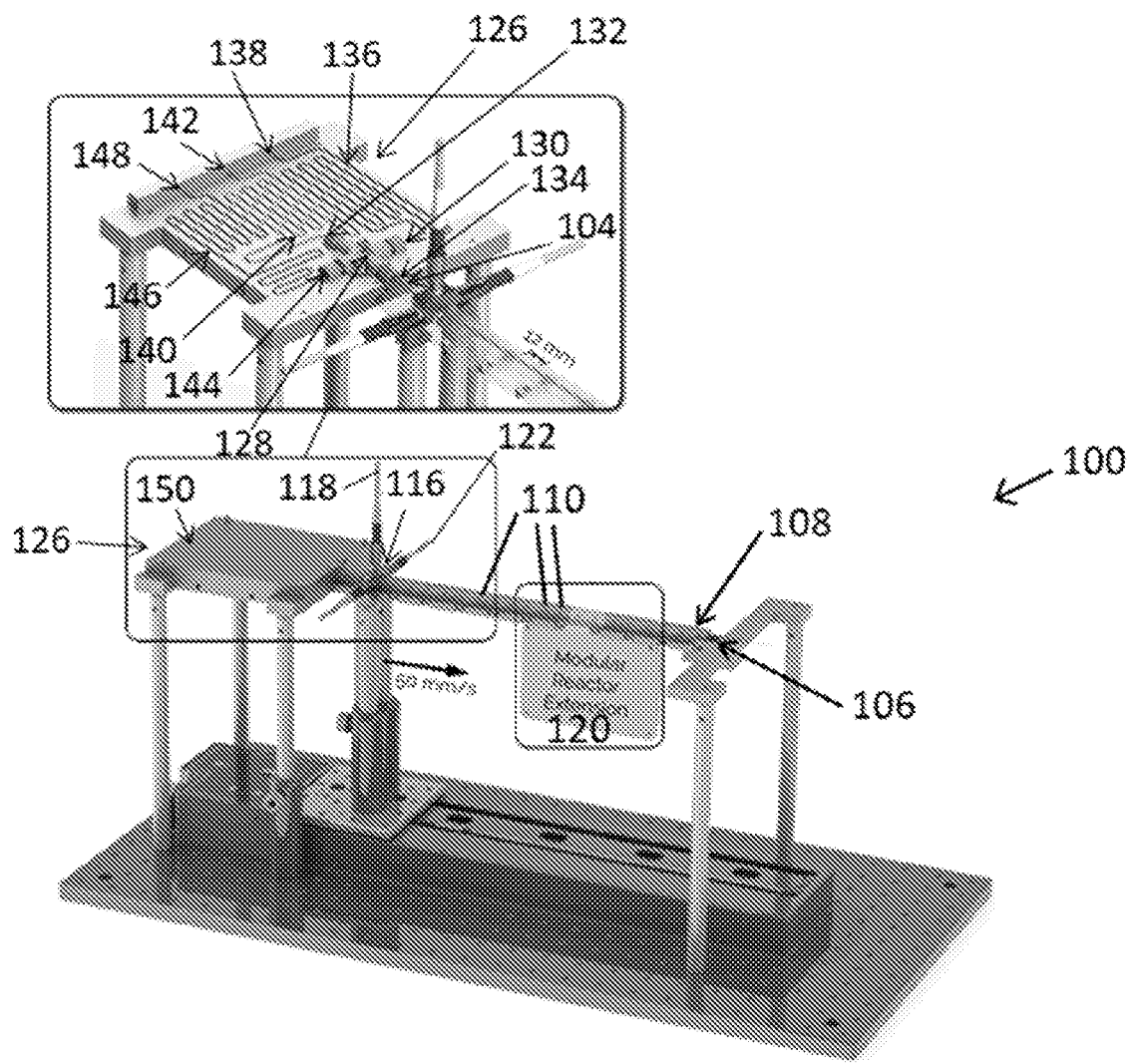
FIG. 3 is a schematic of an exemplary device as disclosed herein.

The devices 100 can, in some examples, further comprise a sample preparation element 126 fluidly connected to the sample inlet 104. Referring now to FIG. 3, the sample preparation element 126 can comprise: a chamber 128 for sample mixing, the chamber comprising: a first inlet 130, a second inlet 132, and an outlet 134, wherein the first inlet 130, the second inlet 132, and the outlet 134 are fluidly connected via the chamber 128 and the outlet 134 is fluidly connected to the sample inlet 104; a first precursor conduit 136 fluidly connecting a first precursor inlet 138 to the first inlet 130 of the chamber 128; and a second precursor conduit 140 fluidly connecting a second precursor inlet 142 to the second inlet 132 of the chamber 128. In some examples, the chamber 128 can further comprise a third inlet 144 and the sample preparation element 126 further comprises a continuous phase conduit 146 fluidly connecting a continuous phase inlet 148 to the third inlet 144 of the chamber 128. In some examples, the chamber 128 further comprises a mixing element. The inclusion or exclusion of the sample preparation element 126 and the number of inlets in the chamber 128 can be selected such that the device 100 can be configured for single-phase or multi-phase flow (e.g., gas-liquid or liquid-liquid).

The sample preparation element 126 can, in some example, further comprise a thermal jacket 150, wherein the thermal jacket 150 substantially encapsulates the chamber 128, the first precursor conduit 136, the second precursor conduit 140, and, when present, the continuous phase conduit 146. The thermal jacket 150 can comprise any suitable thermally conductive material. In some examples, the thermal jacket 150 comprises a metal (e.g., aluminum).

The device 100 can, in some examples, further comprise a heating element thermally connected to the thermal jacket 150 and/or the thermal housing 108 to control the temperature of the thermal jacket 150 and/or the thermal housing 108. The heating element can set the temperature of the thermal jacket 150 and/or the thermal housing 108 to a temperature of, for example, 25° C. or more (e.g., 30° C. or more, 35° C. or more, 40° C. or more, 45° C. or more, 50° C. or more, 55° C. or more, 60° C. or more, 65° C. or more, 70° C. or more, 75° C. or more, 80° C. or more, 85° C. or more, 90° C. or more, 95° C. or more, 100° C. or more, 110° C. or more, 120° C. or more, 130° C. or more, 140° C. or more, 150° C. or more, 160° C. or more, 170° C. or more, 180° C. or more, or 190° C. or more). In some examples, the heating element can set the temperature of the thermal jacket 150 and/or the thermal housing 108 to a temperature of 210° C. or less (e.g., 200° C. or less, 190° C. or less, 180° C. or less, 170° C. or less, 160° C. or less, 150° C. or less, 140° C. or less, 130° C. or less, 120° C. or less, 110° C. or less, 100° C. or less, 95° C. or less, 90° C. or less, 85° C. or less, 80° C. or less, 75° C. or less, 70° C. or less, 65° C. or less, 60° C. or less, 55° C. or less, 50° C. or less, 45° C. or less, 40° C. or less, or 35° C. or less). The temperature that the heating element sets the thermal jacket 150 and/or the thermal housing 108 to can range from any of the minimum values described above to any of the maximum values described above. For example, the heating element can set the temperature of the thermal jacket 150 and/or the thermal housing 108 to a temperature of from 25° C. to 210° C. (e.g., from 25° C. to 115° C., from 115° C. to 210° C., from 25° C. to 55° C., from 55° C. to 85° C., from 85° C. to 105° C., from 105° C. to 135° C., from 135° C. to 160° C., from 165° C. to 195° C., from 195° C. to 210° C., or from 35° C. to 200° C.).

In some examples, the devices 100 can further comprise an injector fluidly connected to a sample reservoir such that the injector is configured to inject a sample into the sample conduit 102 at a first flow rate via the sample inlet 104. In some examples, the devices 100 can further comprise an injector fluidly connected to a first precursor reservoir such that the injector is configured to inject an amount of a first precursor from the first precursor reservoir into the first precursor conduit 136 via the first precursor inlet 138, an injector fluidly connected to a second precursor reservoir such that the injector is configured to inject an amount of a second precursor from the second precursor reservoir into the second precursor conduit 140 via the second precursor inlet 142, thereby forming a sample in the chamber 128. In some examples, the devices 100 can further comprise an injector fluidly connected to the chamber 128 such that the injector is configured to inject the sample from the chamber 128 into the sample conduit 102 at a first flow rate via the sample inlet 104. In some examples, the devices can further comprise injector fluidly connected to a continuous phase reservoir such that the injector is configured to inject an amount of a continuous phase into the continuous phase conduit 146 via the continuous phase inlet 148. In some examples, the one or more injectors can be configured such that the device 100 can be configured for single-phase or multi-phase flow (e.g., gas-liquid or liquid-liquid).

The first flow rate can, for example, be 0.1 microliters per minute (μL/min) or more (e.g., 0.2 μL/min or more; 0.3 μL/min or more; 0.4 μL/min or more; 0.5 μL/min or more; 1 μL/min or more; 2 μL/min or more; 3 μL/min or more; 4 μL/min or more; 5 μL/min or more; 10 μL/min or more; 15 μL/min or more; 20 μL/min or more; 25 μL/min or more; 30 μL/min or more; 35 μL/min or more; 40 μL/min or more; 45 μL/min or more; 50 μL/min or more; 60 μL/min or more; 70 μL/min or more; 80 μL/min or more; 90 μL/min or more; 100 μL/min or more; 125 μL/min or more; 150 μL/min or more; 175 μL/min or more; 200 μL/min or more; 225 μL/min or more; 250 μL/min or more; 300 μL/min or more; 350 μL/min or more; 400 μL/min or more; 450 μL/min or more; 500 μL/min or more; 600 μL/min or more; 700 μL/min or more; 800 μL/min or more; 900 μL/min or more; 1,000 μL/min or more; 1,250 μL/min or more; 1,500 μL/min or more; 1,750 μL/min or more; 2,000 μL/min or more; 2,250 μL/min or more; 2,500 μL/min or more; 3,000 μL/min or more; 3,500 μL/min or more; 4,000 μL/min or more; 4,500 μL/min or more; 5,000 μL/min or more; 6,000 μL/min or more; 7,000 μL/min or more; 8,000 μL/min or more; 9,000 μL/min or more; 10,000 μL/min or more; 12,500 μL/min or more; 15,000 μL/min or more; 17,500 μL/min or more; or 20,000 μL/min or more).

In some examples, the first flow rate can be 25,000 μL/min or less (e.g., 22,500 μL/min or less; 20,000 μL/min or less; 17,500 μL/min or less; 15,000 μL/min or less; 12,500 μL/min or less; 10,000 μL/min or less; 9,000 μL/min or less; 8,000 μL/min or less; 7,000 μL/min or less; 6,000 μL/min or less; 5,000 μL/min or less; 4,500 μL/min or less; 4,000 μL/min or less; 3,500 μL/min or less; 3,000 μL/min or less; 2,500 μL/min or less; 2,250 μL/min or less; 2,000 μL/min or less; 1,750 μL/min or less; 1,500 μL/min or less; 1,250 μL/min or less; 1,000 μL/min or less; 900 μL/min or less; 800 μL/min or less; 700 μL/min or less; 600 μL/min or less; 500 μL/min or less; 450 μL/min or less; 400 μL/min or less; 350 μL/min or less; 300 μL/min or less; 250 μL/min or less; 225 μL/min or less; 200 μL/min or less; 175 μL/min or less; 150 μL/min or less; 125 μL/min or less; 100 μL/min or less; 90 μL/min or less; 80 μL/min or less; 70 μL/min or less; 60 μL/min or less; 50 μL/min or less; 45 μL/min or less; 40 μL/min or less; 35 μL/min or less; 30 μL/min or less; 25 μL/min or less; 20 μL/min or less; 15 μL/min or less; 10 μL/min or less; 5 μL/min or less; 4 μL/min or less; 3 μL/min or less; 2 μL/min or less; or 1 μL/min or less).

The first flow rate can range from any of the minimum values described above to any of the maximum values described above. For example, the first flow rate can be from 0.1 μL/min to 25,000 μL/min (e.g., from 0.1 μL/min to 1 μL/min; from 1 μL/min to 10 μL/min; from 10 μL/min to 100 μL/min; from 100 μL/min to 1,000 μL/min; from 1,000 μL/min to 25,000 μL/min; from 5 μL/min to 5,000 μL/min; or from 44 μL/min to 1854 μL/min).

In some examples, the sample can comprise a plurality of particles, such as a plurality of metal particles, a plurality of semiconductor particles, or a combination thereof. In some examples, the sample can comprise a plurality of polymer capped metal particles, such as a plurality of plasmonic particles, a plurality of quantum dots, or combinations thereof.

The plurality of particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

For example, the plurality of particles can have an average particle size of 1 nanometer (nm) or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, or 800 nm or more). In some examples, the plurality of particles can have an average particle size of 1 micrometer (micron, μm) or less (e.g., 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, 10 nm or less, 9 nm or less, 8 nm or less, 7 nm or less, 6 nm or less, or 5 nm or less). The average particle size of the plurality of particles can range from any of the minimum values described above to any of the maximum values described above. For example, the plurality of particles can have an average particle size of 1 nm to 1 micron (e.g., from 1 nm to 500 nm, from 500 nm to 1 μm, from 1 nm to 200 nm, from 200 nm to 400 nm from 400 nm to 600 nm, from 600 nm to 800 nm, from 800 nm to 1 μm, from 1 nm to 100 nm, from 1 nm to 50 nm, or from 5 nm to 900 nm).

In some examples, the plurality of particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The plurality of particles can comprise particles of any shape (e.g., a sphere, a rod, a quadrilateral, an ellipse, a triangle, a polygon, etc.). In some examples, the plurality of particles can have an isotropic shape. In some examples, the plurality of particles can have an anisotropic shape.

In some examples, the plurality of particles can comprise a first population of particles comprising a first material and having a first particle shape and a first average particle size and a second population of particles comprising a second material and having a second particle shape and a second average particle size; wherein the first particle shape and the second particle shape are different, the first material and the second material are different, the first average particle size and the second average particle size are different, or a combination thereof. In some examples, the plurality of particles can comprise a mixture of a plurality of populations of particles, wherein each population of particles within the mixture is different with respect to shape, composition, size, or combinations thereof.

In some examples, the sample can comprise an organic molecule.

In some examples, the devices 100 can further comprise a second detector fluidly coupled to the sample outlet 106. In some examples, the devices 100 can further comprise a chromatograph fluidly coupled to the sample outlet 106.

Figure 4:
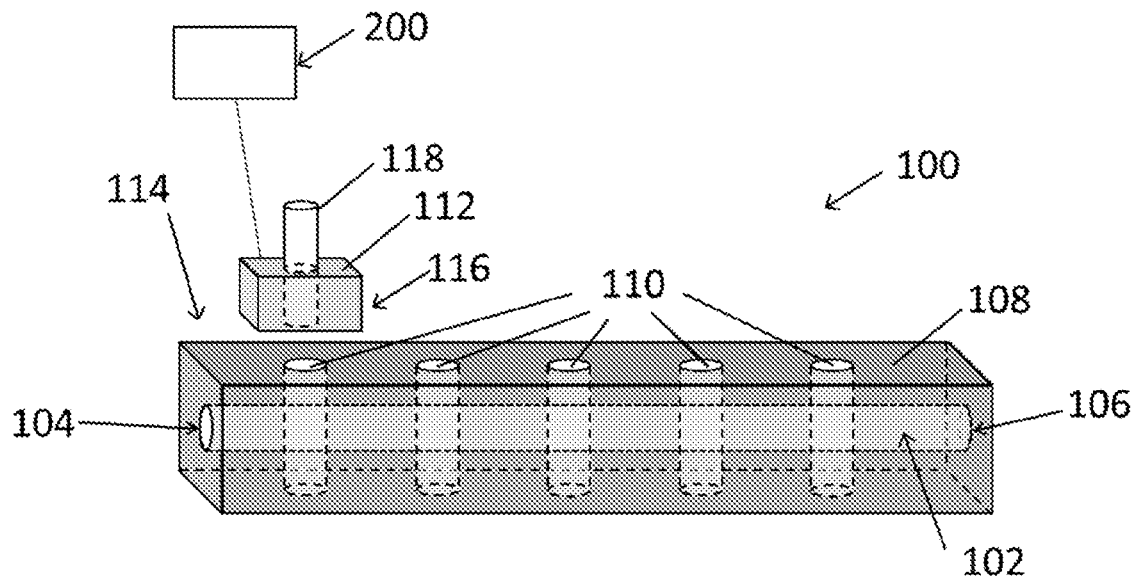
FIG. 4 is a schematic of an exemplary device as disclosed herein.
Figure 5:
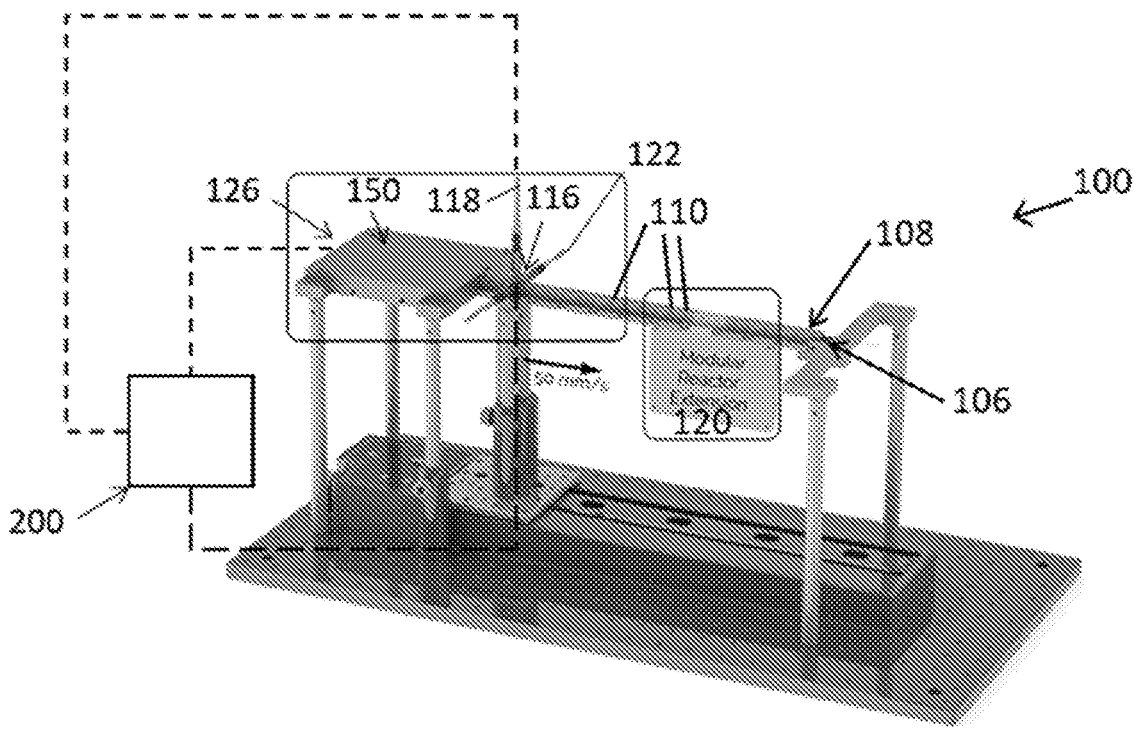
FIG. 5 is a schematic of an exemplary device as disclosed herein.

In some examples, the devices 100 can further comprise a computing device 200 configured to send, receive, and/or process signals from the motorized stage, the detector, the light source, the heating element, an injector fluidly coupled to a sample reservoir such that the injector is configured to inject a sample into the sample conduit 102 at a first flow rate via the sample inlet 104, an injector fluidly connected to a first precursor reservoir such that the injector is configured to inject an amount of a first precursor into the first precursor conduit 136 via the first precursor inlet 138, an injector fluidly connected to a second precursor reservoir such that the injector is configured to inject an amount of a second precursor into the second precursor conduit 140 via the second precursor inlet 142, an injector fluidly connected to a continuous phase reservoir such that the injector is configured to inject an amount of a continuous phase into the continuous phase conduit 146 via the continuous phase inlet 148, or a combination thereof, for example as shown in FIG. 4 and FIG. 5.

Figure 6:
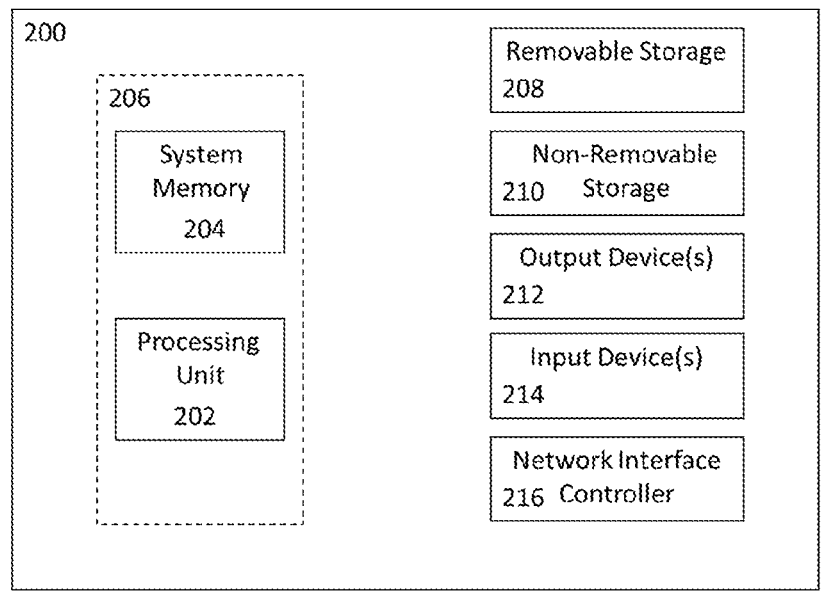
FIG. 6 is a schematic of an exemplary computing device.

FIG. 6 illustrates an example computing device 200 upon which examples disclosed herein may be implemented. The computing device 200 can include a bus or other communication mechanism for communicating information among various components of the computing device 200. In its most basic configuration, computing device 200 typically includes at least one processing unit 202 (a processor) and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 20 by a dashed line 206. The processing unit 202 may be a standard programmable processor that performs arithmetic and logic operations necessary for operation of the computing device 200.

The computing device 200 can have additional features/functionality. For example, computing device 200 may include additional storage such as removable storage 208 and non-removable storage 210 including, but not limited to, magnetic or optical disks or tapes. The computing device 200 can also contain network connection(s) 216 that allow the device to communicate with other devices. The computing device 200 can also have input device(s) 214 such as a keyboard, mouse, touch screen, antenna or other systems configured to communicate with the camera in the system described above, etc. Output device(s) 212 such as a display, speakers, printer, etc. may also be included. The additional devices can be connected to the bus in order to facilitate communication of data among the components of the computing device 200.

The processing unit 202 can be configured to execute program code encoded in tangible, computer-readable media. Computer-readable media refers to any media that is capable of providing data that causes the computing device 200 (i.e., a machine) to operate in a particular fashion. Various computer-readable media can be utilized to provide instructions to the processing unit 202 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 202 can execute program code stored in the system memory 204. For example, the bus can carry data to the system memory 204, from which the processing unit 202 receives and executes instructions. The data received by the system memory 204 can optionally be stored on the removable storage 208 or the non-removable storage 210 before or after execution by the processing unit 202.

The computing device 200 typically includes a variety of computer-readable media. Computer-readable media can be any available media that can be accessed by device 200 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 204, removable storage 208, and non-removable storage 210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media can be part of computing device 200.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In some examples, the signals from the motorized stage, the detector, the light source, the heating element, an injector fluidly coupled to a sample reservoir such that the injector is configured to inject a sample into the sample conduit 102 at a first flow rate via the sample inlet 104, an injector fluidly connected to a first precursor reservoir such that the injector is configured to inject an amount of a first precursor into the first precursor conduit 136 via the first precursor inlet 138, an injector fluidly connected to a second precursor reservoir such that the injector is configured to inject an amount of a second precursor into the second precursor conduit 140 via the second precursor inlet 142, an injector fluidly connected to a continuous phase reservoir such that the injector is configured to inject an amount of a continuous phase into the continuous phase conduit 146 via the continuous phase inlet 148, or a combination thereof, can be sent, received, and/or processed in whole or in part on one or more computing device. For example, the devices can comprise one or more additional computing devices.

In certain examples, the system memory 204 has computer-executable instructions stored thereon that, when executed by the processor, cause the processor to:
  a. translate the motorized stage 112 along the thermal housing 108 to such that the detector 118 is aligned at a first location proximate a first measurement region;
  b. capture a first spectroscopic signal via the detector 118 at the first location proximate the first measurement region, wherein the first spectroscopic signal has a first intensity;
  c. optionally, store the first spectroscopic signal and/or the intensity of the first spectroscopic signal;
  d. optionally, output the first spectroscopic signal and/or the intensity of the first spectroscopic signal;
  e. translate the motorized stage 112 along the thermal housing 108 from the first location proximate the first measurement region to a second location proximate the first measurement region;
  f. capture a second spectroscopic signal via the detector 118 at the second location proximate the first measurement region, wherein the second spectroscopic signal has a second intensity;
  g. optionally, store the first spectroscopic signal and/or the intensity of the first spectroscopic signal;
  h. optionally, output the first spectroscopic signal and/or the intensity of the first spectroscopic signal;
  i. compare the intensity of the first spectroscopic signal to the intensity of the second spectroscopic signal;
  j. repeat steps a-i to find the location at which the intensity of the spectroscopic signal is largest, thereby determining the location of the first measurement region; and
  k. output the location of the first measurement region.

In some examples, the system memory 204 computer-executable instructions stored thereon that, when executed by the processor, cause the processor to repeat steps a-k to determine and output the location of a second measurement region.

In certain examples, the system memory 204 has computer-executable instructions stored thereon that, when executed by the processor, cause the processor to:
  a. inject a sample into the sample conduit 102 at a first flow rate via the sample inlet 104;
  b. optionally, set the temperature of the thermal housing 108 to a first temperature;
  c. translate the motorized stage 112 along the thermal housing 108 to a first measurement region;
  d. capture a spectroscopic signal from the sample within the sample conduit 102 at the first measurement region;
  e. optionally, analyze the spectroscopic signal to determine a property of the sample; and
  f. output the spectroscopic signal, the property of the sample, the temperature of the thermal housing, or a combination thereof.

In some examples, the system memory 204 has computer-executable instructions stored thereon that, when executed by the processor, cause the processor to repeat steps a-e at a second measurement region.

In certain examples, the system memory 204 has computer-executable instructions stored thereon that, when executed by the processor, cause the processor to:
  a. inject an amount of a first precursor from a first precursor reservoir into the first precursor conduit 136 via the first precursor inlet 138 and inject an amount of a second precursor from a second precursor reservoir into the second precursor conduit 140 via the second precursor inlet 142, an optionally inject an amount of a continuous phase from a continuous phase reservoir into the continuous phase conduit 146 via the continuous phase inlet 148, thereby forming a sample in the chamber 128;
  b. optionally, set the temperature of the thermal housing 108 and/or the thermal jacket 150 to a first temperature;
  c. inject the sample from the chamber 128 into the sample conduit 102 at a first flow rate via the sample inlet 104;
  d. translate the motorized stage 112 along the thermal housing 108 to a first measurement region;

e. capture a spectroscopic signal from the sample within the sample conduit 102 at the first measurement region;

f. optionally, analyze the spectroscopic signal to determine a property of the sample;

g. optionally, output the spectroscopic signal and/or the property of the sample;

h. compare the captured spectroscopic signal and/or the property of the sample to an input parameter;

i. when the input parameter is different than the captured spectroscopic signal and/or the property of the sample: translate the motorized stage 112 along the thermal housing 108 to a second measurement region and repeat steps e-h; and/or adjust the amount of the first precursor, the amount of the second precursor, the amount of the continuous phase, the temperature of the thermal housing 108, the temperature of the thermal jacket 142, the first flow rate, or a combination thereof, and repeat steps a-h;

and j. when the input parameter and the captured spectroscopic signal and/or the property of the sample are the same: output the amount of the first precursor injected, the amount of the second precursor injected, the amount of the continuous phase injected, the temperature of the thermal housing 108, the temperature of the thermal jacket 142, the location of the measurement region, the captured spectroscopic signal, the property of the sample, the first flow rate, or a combination thereof.

In certain examples, the system memory 204 has computer-executable instructions stored thereon that, when executed by the processor, cause the processor to:

a. inject a sample into the sample conduit 102 at a first flow rate via the sample inlet 104;

b. optionally, set the temperature of the thermal housing 108 to a first temperature;

c. capture a chromatographic signal from the sample at the sample outlet 106 via the chromatograph;

d. optionally, analyze the chromatographic signal to determine a property of the sample; and e. output the chromatographic signal, the property of the sample, the temperature of the thermal housing, or a combination thereof.

In certain examples, the system memory 204 has computer-executable instructions stored thereon that, when executed by the processor, cause the processor to:

a. inject an amount of a first precursor from a first precursor reservoir into the first precursor conduit 136 via the first precursor inlet 138 and inject an amount of a second precursor from a second precursor reservoir into the second precursor conduit 140 via the second precursor inlet 142, and optionally inject an amount of a continuous phase from a continuous phase reservoir into the continuous phase conduit 146 via the continuous phase inlet 148, thereby forming a sample in the chamber 128;

b. optionally, set the temperature of the thermal housing 108 and/or the thermal jacket 150 to a first temperature;

c. inject the sample from the chamber 128 into the sample conduit 102 at a first flow rate via the sample inlet 104;

d. capture a chromatographic signal from the sample at the sample outlet 106 via the chromatograph;

e. optionally, analyze the chromatographic signal to determine a property of the sample;

f. optionally, output the chromatographic signal and/or the property of the sample;

g. compare the captured chromatographic signal and/or the property of the sample to an input parameter;

h. when the input parameter is different than the captured chromatographic signal and/or the property of the sample: adjust the amount of the first precursor, the amount of the second precursor, the amount of the continuous phase, the temperature of the thermal housing 108, the temperature of the thermal jacket 142, the first flow rate, or a combination thereof, and repeat steps a-g;

and i. when the input parameter and the captured chromatographic signal and/or the property of the sample are the same: output the amount of the first precursor injected, the amount of the second precursor injected, the amount of the continuous phase injected, the temperature of the thermal housing 108, the temperature of the thermal jacket 142, the captured chromatographic signal, the property of the sample, the first flow rate, or a combination thereof.

In some examples, the sample comprises a plurality of particles and the property of the sample and/or the input parameter can comprise the fluorescence of the plurality of particles, the absorption of the plurality of particles, the average particle size of the plurality of particles, the concentration of the plurality of particles within the sample, the monodispersity of the plurality of particles, or a combination thereof.

In some examples, the sample comprises an organic molecule and the property of the sample and/or the input parameter can comprise the fluorescence of the organic molecule, the absorption of the organic molecule, the identity of the organic molecule, the concentration of the organic molecule within the sample, or a combination thereof.

Also described herein are modular systems for the preparation of nanomaterials, the systems comprising: a sample conduit providing a path for fluid flow extending from a sample inlet to a sample outlet, wherein the sample conduit is formed from one or more modules, wherein each of the one or more modules comprises a fluid flow path of a predetermined length such that a sample conduit having a path for fluid flow of a desired length can be assembled by fluidly connecting one or more of the modules; and a thermal housing enclosing the sample conduit.

Also described herein are methods for the preparation of a sample using any of the devices or systems described herein.

For example, described herein are methods of determining the location of a measurement region in any of the devices described herein, the methods comprising:

a. translating the motorized stage 112 along the thermal housing 108 to such that the detector 118 is aligned at a first location proximate a first measurement region;

b. capturing a first spectroscopic signal via the detector 118 at the first location proximate the first measurement region, wherein the first spectroscopic signal has a first intensity;

c. translating the motorized stage 112 along the thermal housing 108 from the first location proximate the first measurement region to a second location proximate the first measurement region;

d. capturing a second spectroscopic signal via the detector 118 at the second location proximate the first measurement region, wherein the second spectroscopic signal has a second intensity;

e. compare the intensity of the first spectroscopic signal to the intensity of the second spectroscopic signal;

f. repeating steps a-e to find the location at which the intensity of the spectroscopic signal is largest, thereby determining the location of the first measurement region; and g. optionally, repeating steps a-f to determine the location of a second measurement region.

Also described herein are methods for capturing a spectroscopic signal from a sample, the methods comprising:

a. injecting a sample into the sample conduit 102 at a first flow rate via the sample inlet 104;

b. optionally, setting the temperature of the thermal housing 108 to a first temperature;

c. translating the motorized stage 112 along the thermal housing 108 to a first measurement region;

d. capturing a spectroscopic signal from the sample within the sample conduit 102 at the first measurement region;

e. optionally, analyzing the spectroscopic signal to determine a property of the sample; and f. optionally, repeating steps a-e at a second measurement region.

Also described herein are methods for synthesizing a sample with a desired characteristic, the methods comprising:

a. injecting an amount of a first precursor from a first precursor reservoir into the first precursor conduit 136 via the first precursor inlet 138 and injecting an amount of a second precursor from a second precursor reservoir into the second precursor conduit 140 via the second precursor inlet 142, and optionally injecting an amount of a continuous phase from a continuous phase reservoir into the continuous phase conduit 146 via the continuous phase inlet 148, thereby forming a sample in the chamber 128;

b. optionally, setting the temperature of the thermal housing 108 and/or the thermal jacket 150 to a first temperature;

c. injecting the sample from the chamber 128 into the sample conduit 102 at a first flow rate via the sample inlet 104;

d. translating the motorized stage 112 along the thermal housing 108 to a first measurement region;

e. capturing a spectroscopic signal from the sample within the sample conduit 102 at the first measurement region;

f. optionally, analyzing the spectroscopic signal to determine a property of the sample;

g. comparing the captured spectroscopic signal and/or the property of the sample to an input parameter; and h. when the input parameter is different than the captured spectroscopic signal and/or the property of the sample: translate the motorized stage 112 along the thermal housing 108 to a second measurement region and repeat steps e-g; and/or adjust the amount of the first precursor, the amount of the second precursor, the amount of the continuous phase, the temperature of the thermal housing 108, the temperature of the thermal jacket 142, the first flow rate, or a combination thereof, and repeat steps a-g.

Also disclosed herein are methods for capturing a chromatographic signal of a sample, the methods comprising:

a. injecting a sample into the sample conduit 102 at a first flow rate via the sample inlet 104;

b. optionally, setting the temperature of the thermal housing 108 to a first temperature;

c. capturing a chromatographic signal from the sample at the sample outlet 106 via the chromatograph; and d. optionally, analyze the chromatographic signal to determine a property of the sample.

Also disclosed herein are methods for synthesizing a sample with a desired characteristic, the methods comprising:

a. injecting an amount of a first precursor from a first precursor reservoir into the first precursor conduit 136 via the first precursor inlet 138 and injecting an amount of a second precursor from a second precursor reservoir into the second precursor conduit 140 via the second precursor inlet 142, and optionally injecting an amount of a continuous phase from a continuous phase reservoir into the continuous phase conduit 146 via the continuous phase inlet 148, thereby forming a sample in the chamber 128;

b. optionally, setting the temperature of the thermal housing 108 and/or the thermal jacket 150 to a first temperature;

c. injecting the sample from the chamber 128 into the sample conduit 102 at a first flow rate via the sample inlet 104;

d. capturing a chromatographic signal from the sample at the sample outlet 106 via the chromatograph;

e. optionally, analyzing the chromatographic signal to determine a property of the sample;

f. comparing the captured chromatographic signal and/or the property of the sample to an input parameter;

g. when the input parameter is different than the captured chromatographic signal and/or the property of the sample: adjusting the amount of the first precursor, the amount of the second precursor, the amount of the continuous phase, the temperature of the thermal housing 108, the temperature of the thermal jacket 142, the first flow rate, or a combination thereof, and repeating steps a-f.

For example, also described herein are methods for the preparation of a plurality of particles, the methods comprising: contacting a first precursor with a second precursor thereby forming a fluid precursor sample; injecting the fluid precursor sample into the sample inlet of any of the devices described herein; flowing the fluid precursor sample from the sample inlet to the sample outlet, wherein the first precursor reacts with the second precursor as the fluid precursor sample flows from the sample inlet to the sample outlet to form a sample comprising a plurality of particles before reaching the sample outlet; and collecting the plurality of particles at the sample outlet. In some examples, the plurality of particles have a desired property and the method further comprises optimizing the synthesis conditions to achieve the desired property using any of the devices described herein.

Also described herein are methods for the preparation of an organic molecule, the methods comprising: contacting a first precursor with a second precursor thereby forming a fluid precursor sample; injecting the fluid precursor sample into the sample inlet of any of the devices described herein; flowing the fluid precursor sample from the sample inlet to the sample outlet, wherein the first precursor reacts with the second precursor as the fluid precursor sample flows from the sample inlet to the sample outlet to form a sample comprising an organic molecule before reaching the fluid outlet; and collecting the organic molecule at the sample outlet. In some examples, the organic molecule has a desired property and the method further comprises optimizing the synthesis conditions to achieve the desired property using any of the devices described herein.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Over the past two decades, colloidal semiconductor nanocrystals, known as quantum dots (QDs), (e.g., CdSe, ZnS, InP, and organic/inorganic perovskite) have been extensively explored for device-level applications in solution processed photovoltaics and light emitting diodes. While the synthesis (nucleation and growth) of group II-VI and group III-V quantum dots have been extensively characterized, a fundamental and complete understanding of the next generation of quantum dots—such as organic/inorganic halide perovskite quantum dots—has yet to be established. Comprehensive characterization of the reaction kinetics for these groups as well as continuous inline optimization to account for batch-to-batch variability would significantly enhance band-gap engineering in large-scale manufacturing. In the effort to discover and develop next-generation quantum dots, there exists a significant need for the development of automated robust strategies that rapidly explore the large parameter space (both continuous and discrete variables) associated with the synthesis of quantum dots and simultaneously deliver high quality, application-ready nanoparticles (Yap et al. *Chem. Eng. Sci.*, 2017, 169, 117-127; Niu et al. *Chem. Soc. Rev.*, 2015, 44, 5806-5820).

Figure 7A:
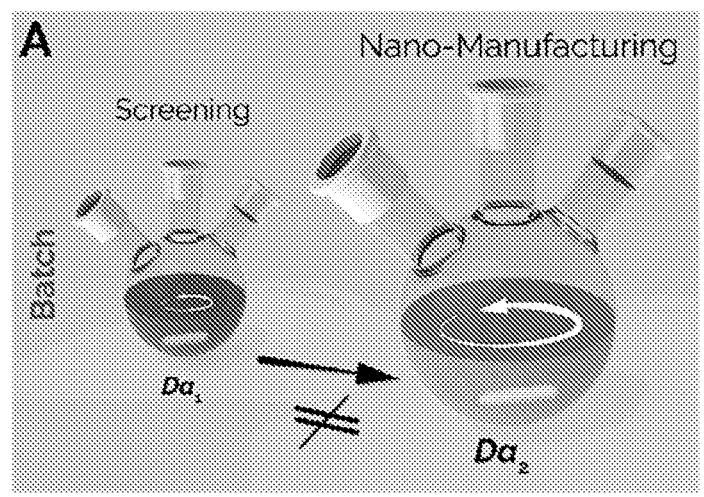
FIG. 7A is a schematic of mixing and mass transfer limitations of batch systems for screening and large-scale manufacturing of colloidal semiconductor nanocrystals.

Although conventional flask-based strategies have been the main driving force for the discovery and studies of quantum dots over the past three decades (Murray et al. *Annu. Rev. Mater. Sci.*, 2000, 30, 545-610; Murray et al. *J. Am. Chem. Soc.*, 1993, 115, 8706-8715), approaching characterization, screening, and optimization of quantum dots with a manual batch system presents inherent limitations in sampling rate, reagent volume, and analysis time (Marre et al. *Chem. Soc. Rev.*, 2010, 39, 1183-1202; Zhang et al. *Adv. Mater.*, 2014, 26, 2600-2606). Furthermore, scale-up from batch synthesis for large-scale manufacturing of high-quality quantum dots often amplifies existing mixing inefficiencies and well-known batch-to-batch variation that can further affect the resulting products through variable and unfavorable heat and mass transfer kinetics. In the case of inorganic halide perovskite quantum dots (e.g., cesium lead trihalide), nucleation and growth kinetics occur on the order of seconds (Hou et al. *ACS Appl. Mater. Interfaces*, 2017, 9(22), 18417-18422; Protesescu et al. *Nano Lett.*, 2015, 15, 3692-3696). Therefore, it may be challenging to obtain sufficiently small Damköhler numbers (Da) in batch systems for accurate (i.e., not mass transfer limited) reaction kinetics characterization, which may result in an inhomogeneous nucleation process (FIG. 7A) (Hartman et al. *Angew. Chemie Int. Ed.*, 2011, 50, 7502-7519).

Figure 7B:
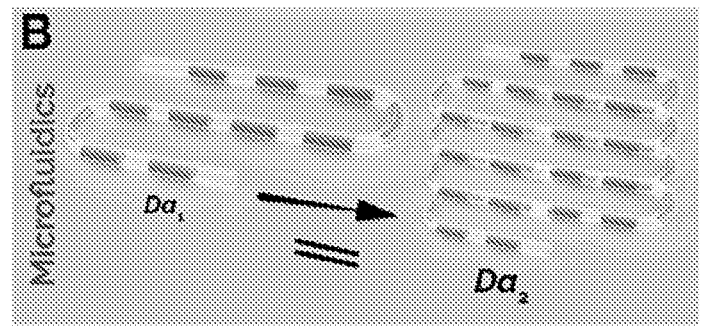
FIG. 7B is a schematic of mixing and mass transfer limitations of multi-phase microfluidic strategies for screening and large-scale manufacturing of colloidal semiconductor nanocrystals.

Over the past decade, microfluidics have been promoted as an alternative strategy towards addressing the previously-mentioned challenges associated with conventional flask-based systems (Lignos et al. *Chem. Mater.*, 2014, 26, 2975-2982; Il Park et al. *Annu. Rev. Mater. Res.*, 2010, 40, 415-443; Phillips et al. *Lab Chip*, 2014, 14, 3172-3180; Lignos et al. *Small*, 2015, 11, 4009-4017; Lignos et al. *Nano Lett.*, 2016, 16, 1869-1877). Single-phase microfluidic strategies, while superior to batch systems in chemical consumption and sampling efficiency, are oftentimes limited to laminar flow regimes with an unwanted axial dispersion, which can restrict mass transfer to radial diffusion (Tice et al. *Langmuir*, 2003, 19, 9127-9133). In contrast, microscale multi-phase flow can achieve substantially shorter mixing timescales, on the order of 1 ms, due to two axisymmetric recirculation patterns formed within the moving droplets (Gunther et al. *Langmuir*, 2005, 21, 1547-1555). The enhanced mixing and mass transfer characteristics of multi-phase microfluidics makes it an ideal option for high-throughput screening and inline optimization of the synthesis of colloidal nanocrystals (FIG. 7B). Recently, different multi-phase microfluidic strategies including combinatorial sampling (Toyota et al. *J. Phys. Chem. C*, 2010, 114, 7527-7534), three-phase flow format (Nightingale et al. *Nat. Commun.*, 2014, 5, 3777), single droplet oscillatory flow method (Abolhasani et al. *Chem. Mater.*, 2015, 27, 6131-6138), and chip-based approaches (Krishnadasan et al. *J. Mater. Chem.*, 2004, 14, 2655-2660; Leung et al. *Analyst*, 2005, 130, 46-51; Yen et al. *Angew. Chemie*, 2005, 117, 5583-5587; Khan et al. *Langmuir*, 2004, 20, 8604-8611), have been developed for the labor- and material-efficient characterization and screening of various colloidal semiconductor nanocrystals as well as scaled-up synthesis (Nightingale et al. *J. Mater. Chem. A*, 2013, 1, 4067-4076), It should be noted, however, that consistency in plug formation and flowrates within numbered-up nano-manufacturing platforms presents a critical parameter with respect to uniform mixing and mass transfer characteristics (Al-Rawashdeh et al. *Ind. Eng. Chem. Res.*, 2013, 52, 11516-11526; Zhang et al. *Annu. Rev. Chem. Biomol. Eng.*, 2017, 8, 285-305; Kun Yap et al. *Chem. Eng. Sci.*, 2017, 169, 117-127; Nieves-Remacha et al. Ind. Eng. Chem. Res., 2012, 51, 16251-16262).

In-situ microfluidic studies of nanomaterials synthesis are typically performed using a single detection point attached to the reactor outlet (e.g., UV-Vis, fluorescence, or IR spectroscopy) with a constant length reactor segment (Murray et al. *Annu. Rev. Mater. Sci.*, 2000, 30, 545-610; Murray et al. *J. Am. Chem. Soc.*, 1993, 115, 8706-8715). Time-dependent data are then obtained by varying flow rates within this stationary system. However, the direct correlation between the mixing timescale and the average flow velocity of multi-phase microfluidic strategies, combined with the strong dependency of the formation of nanocrystal nuclei to the degree of mixing, would result in temporal spectral measurements obtained under significantly different mixing characteristics.

Colloidal organic/inorganic metal-halide perovskite nanocrystals have recently emerged as a potential low-cost replacement for the semiconductor materials in commercial photovoltaics and light emitting diodes. However, unlike group III-V and group IV-VI semiconductor nanocrystals, studies of colloidal perovskite nanocrystals have yet to develop a fundamental and comprehensive understanding of nucleation and growth kinetics. Herein, a modular microfluidic platform for in-situ screening and optimization of the synthesis of colloidal nanocrystals with both fast and slow kinetics at the synthesis temperature through controlled mixing is discussed. With abundant data collection across the entirety of four orders of magnitude reaction time span, nanocrystal growth is comprehensively characterized within a modular microfluidic reactor. The developed high-throughput screening platform features a three-port flow cell with translational capability for in-situ spectral characterization of the in-flow synthesized perovskite nanocrystals along a tubular microreactor with an adjustable length, ranging from 3 cm to 196 cm. Utilizing the translating flow cell, a significant improvement in sampling efficiency over stationary flow cell systems is demonstrated by obtaining up to 40 unique sample spectra associated with 20 unique residence times within a single equilibrated flow reactor at a constant mixing timescale. The developed technique uses an average total liquid consumption of 20 μL per spectra and as little as 2 μL at the time of sampling. It can continuously sample up to 30,000 unique spectra per day in both single and multi-phase flow formats. Using the developed plug-and-play microfluidic platform, the growth of cesium lead trihalide perovskite nanocrystals is studied through in-situ monitoring of their absorption and emission band-gaps at residence times ranging from 100 ms to 17 min. The automated microfluidic platform enables a systematic study of the effect of mixing enhancement on the quality of the synthesized nanocrystals through a direct comparison between single- and multi-phase flow systems at similar reaction time scales. The improved mixing characteristics of the multi-phase flow format results in high-quality perovskite nanocrystals with kinetically tunable emission wavelength, ranging as much as 25 nm at equivalent residence times. Further application of this platform can allow rapid parameter optimization in the colloidal synthesis of a wide range of nanomaterials (e.g., metal or semiconductor), that is directly transferable to continuous manufacturing in a numbered-up platform with a similar characteristic length scale.

Experimental

Materials. Cesium hydroxide solution (50 wt % in H2O≥99.9% trace metals basis), lead(II) oxide (≥99.9% trace metals basis), tetraoctylammonium bromide (98%), and oleic acid (technical grade 90%), were purchased from Sigma-Aldrich. Toluene (99.85% extra dry over molecular sieves) was purchased from ARCOS Organics.

Precursor Preparation and Synthesis

The precursor preparation and perovskite synthesis were adapted from elsewhere (Wei et al. *Chem. Commun.*, 2016, 52, 7265-7268), with minor modifications to better suit mixing analyses and continuous flow experiments.

Precursor 1 (Cesium-Lead). A high-concentration Cs—Pb solution (3 mL) was prepared by first heating 0.6 mmol cesium hydroxide, 0.6 mmol lead(II) oxide, and 3 mL oleic acid in an 8 mL vial at 160° C. until a clear solution was formed (approximately 15 minutes), followed by heating at 120° C. for 1 hour. The Cs—Pb precursor (0.0021 M) used in the syntheses was prepared by further diluting 0.5 mL of the high concentration solution with 47.5 mL of toluene in a sealed 50 mL vial.

Precursor 2 (Bromide). The Br precursor solution (0.013 M; 15 mL) was prepared by dissolving 109 mg tetraoctylammonium bromide in 1 mL oleic acid and 14 mL toluene in a sealed 20 mL vial then vigorously stirring until a clear solution was obtained.

Both single and multi-phase flow syntheses were performed by continuously flowing the two precursors at a 6.4:1 (precursor 1):(precursor 2) volumetric ratio. Flow equilibrium in the microreactor was assumed to occur after waiting three residence times for the furthest sampling port. Comparative batch syntheses were performed by swiftly injecting the Br solution into a quickly stirring (700 rpm) Cs—Pb precursor solution in the same volumetric ratio used in flow synthesis.

Reactor Design

Figures 8A, 8B, 8C:
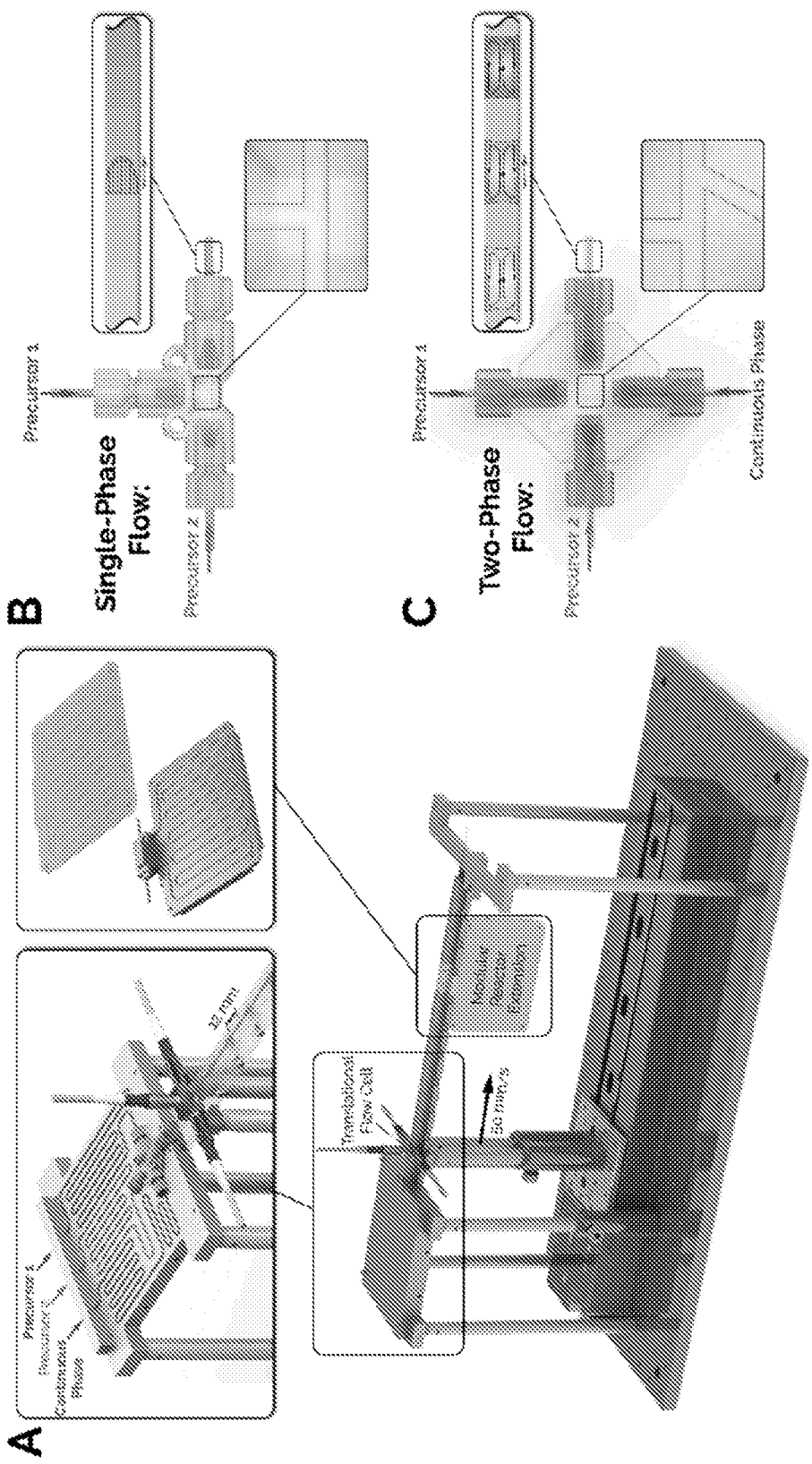
FIG. 8A-FIG. 8C.

The modular screening platform, shown in FIG. 8A, comprises an adjustable length of off-the-shelf Teflon tubing (Microsolv, fluorinated ethylene propylene (FEP), 0.125" OD, 0.04" ID), a translating three-port flow cell, a collection of modular flow cell tracks with sampling ports, and a raised support structure on each end of the reactor length. The support structures, flow cell, and sampling tracks were each machined in aluminum (ProtoLabs), and the modular reactor extensions are 3-D printed in a stereolithography resin (Methacrylate Photopolymer Resin, Formlabs Form 2, 0.025 mm layer resolution). The reconfigurable microreactor system may operate under both single and multi-phase flow formats. Single-phase flow experiments incorporate a T-junction (IDEX Health & Science, 1/16" PEEK), shown in FIG. 8B, while multi-phase flow experiments utilize a PEEK four-way junction with a T-junction combination of precursors followed by a Y-junction plug formation with an inert gas (10 psig, nitrogen), shown in FIG. 8C. Operation of the automated microreactor system is carried out through a LabVIEW script to control three syringe pumps (Harvard Apparatus, PHD Ultra), a 30-cm translational stage with a maximum linear velocity of 5 cm/s (Thorlabs, LTS300), fiber-coupled fluorescence and absorption characterization light sources (Thorlabs, M365LP1; Ocean Optics, DH-2000BAL), and a fiber-coupled photospectrometer (Ocean Optics, Flame Miniature Spectrometer). The translation stage, syringe pumps, fiber-coupled light sources, and fiber-coupled miniature photospectrometer are coordinated through automated LabVIEW controls, shown in FIG. 15. To begin automated controls, the user specifies the desired inputs including condition flow rates, syringe dimensions, integration times, number of spectra to average (10 by default), flow regime (single- or multi-phase), desired sampling timespan (multi-phase only), and approximate sampling port positions. The system starts operation by first establishing communications with and setting a neutral condition for each of the hardware components. The system then undergoes stabilization and port alignment steps. To conduct these processes first, toluene is manually injected into the reaction tubing. The translation stage then runs eight full passes along the aluminum tracks with the embedded Teflon reactor. During the initial 8 passes, the translation stage briefly stops at each sampling port to reduce the setup movement within the newly assembled system during later sampling. The system then detects the precise stage location for optimal sampling at each port. To do this, it turns on the 365 nm LED then samples 20 evenly distributed points across a 1 mm range around the pre-determined approximate port location until a local maximum spectral intensity at 350 nm is found for each port. This position is then saved and used as the specific port location for later sampling. If indicated, the system then collects light and dark references on toluene for each light source at their respective integration times at each port.

After the first flowrate condition is set, based on the user-defined system volume for the furthest sampling port, the system waits for three residence times to reach equilibrium. The translation stage then starts sampling from the port closest to the junction (either T or cross) by triggering the light source toggling system at each port location. This process is repeated for each condition until all desired test parameters have been set and sampled. The system then undergoes shut down procedures by halting all syringe pumps and shutting off light sources before ending the script operation.

In the microreactor system, the ratio of the precursors was adjusted by controlling the volumetric flow rates of precursor 1, $Q_1$, and precursor 2, $Q_2$. The size of the liquid plugs was tuned by adjusting the relative flow rates of the continuous phase (i.e., pressurized nitrogen), $Q_G$, to the total liquid phase, $Q_L=Q_1+Q_2$. Upon reaching equilibrium at the desired feed conditions, the translational stage automatically positions the three-port flow cell along each of the 20 sampling ports. Absorption and photoluminescence (PL) pathlength corrections are applied to take into account the port-to-port variations (FIG. 16A-FIG. 16D and FIG. 17A-FIG. 17D).

The port alignment and sampling process results in precise absorption and photoluminescence measurements for at least thirty passes—i.e. sampling conditions. FIG. 16A-FIG. 16D shows a characterization of this consistency by sampling the measured light source intensities at each port after the alignment and port detection processes. Furthermore, it demonstrates that scaling these intensities across each of the individual ports results in highly uniform spectral measurements throughout the reaction system. During experiments, port alignment was performed after, at most, every thirty tested sample conditions including toluene references.

To account for variations in the sampling pathlength at each port location due to factors such as irregular tube placement or minor deformation, pathlength corrections were applied to each port within every alignment cycle. By performing this scaling operation for a synthesized $CsPbBr_3$ quantum dot sample in toluene across different ports, data collected across the reaction system can be directly compared. Scale factors were determined for base-line corrected photoluminescence and absorption curves and applied to experimentally measured absorption and photoluminescence spectra processed in a comparable manner. Sample data from the pathlength correction process is shown in FIG. 17A-FIG. 17D.

Figure 9:
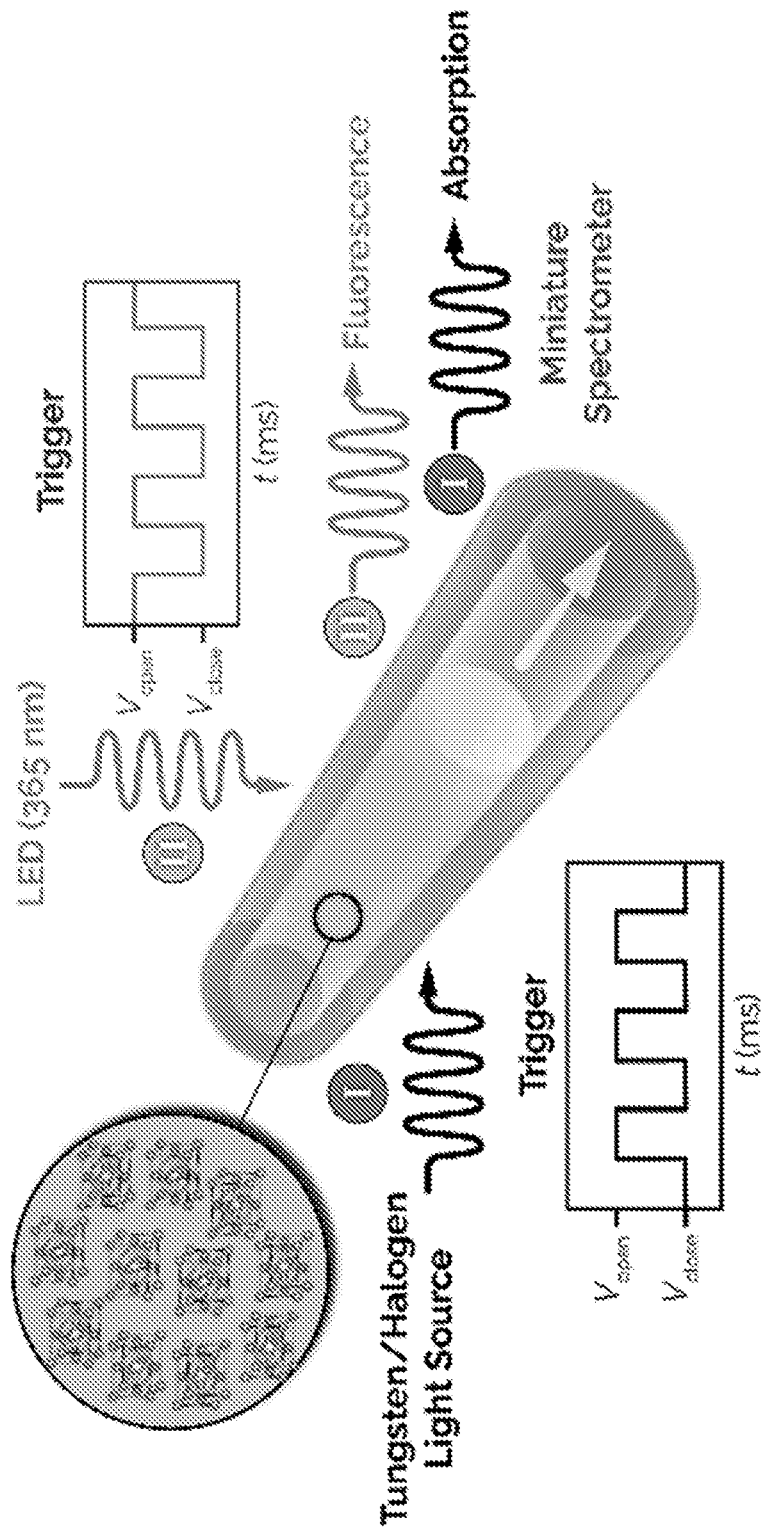
FIG. 9: Schematic of the toggle switching strategy used for the automatic acquisition of both absorption and photoluminescence spectra of in-flow synthesized perovskite quantum dots using the same fiber-coupled miniature photospectrometer.

Upon reaching a preregistered port position, the stage is temporarily stopped and a light-source toggle sampling system, shown in FIG. 9, is applied. The sampling of a single condition includes an average across ten individual spectra for both absorption and photoluminescence, and it may complete in as little as 400 ms. Sampling times for multi-phase flow is dependent upon the specific condition flow rates—e.g., the duration of time required for at least two plugs to pass the sampling port.

The designed modular microfluidic system can be adjusted to capture desired nanocrystal growth characteristics across a large range of average fluid velocities (0.6 mm/s-13 cm/s). With the reactor extension modules, samples can be taken from 3 to 196 cm of microreactor length, while variable fluid flow rates within this modular system allow for residence times to span across four orders of magnitude, from 100 ms to 17 min. The adjustable microreactor length (achieved by extension modules in combination with the translational three-port flow cell) make the developed microfluidic platform an ideal strategy for systematic characterization of mixing properties attributed to differences in fluid velocity at equivalent residence times. By rapidly sampling up to 40 unique ports for a single equilibrated flow condition, the microfluidic platform uses on average 2 µL of precursors for each unique spectrum and can acquire up to 30,000 spectra corresponding to 15,000 experimental conditions within a single day.

Results and Discussion

Plug Detection

Figures 10A, 10B, 10C:
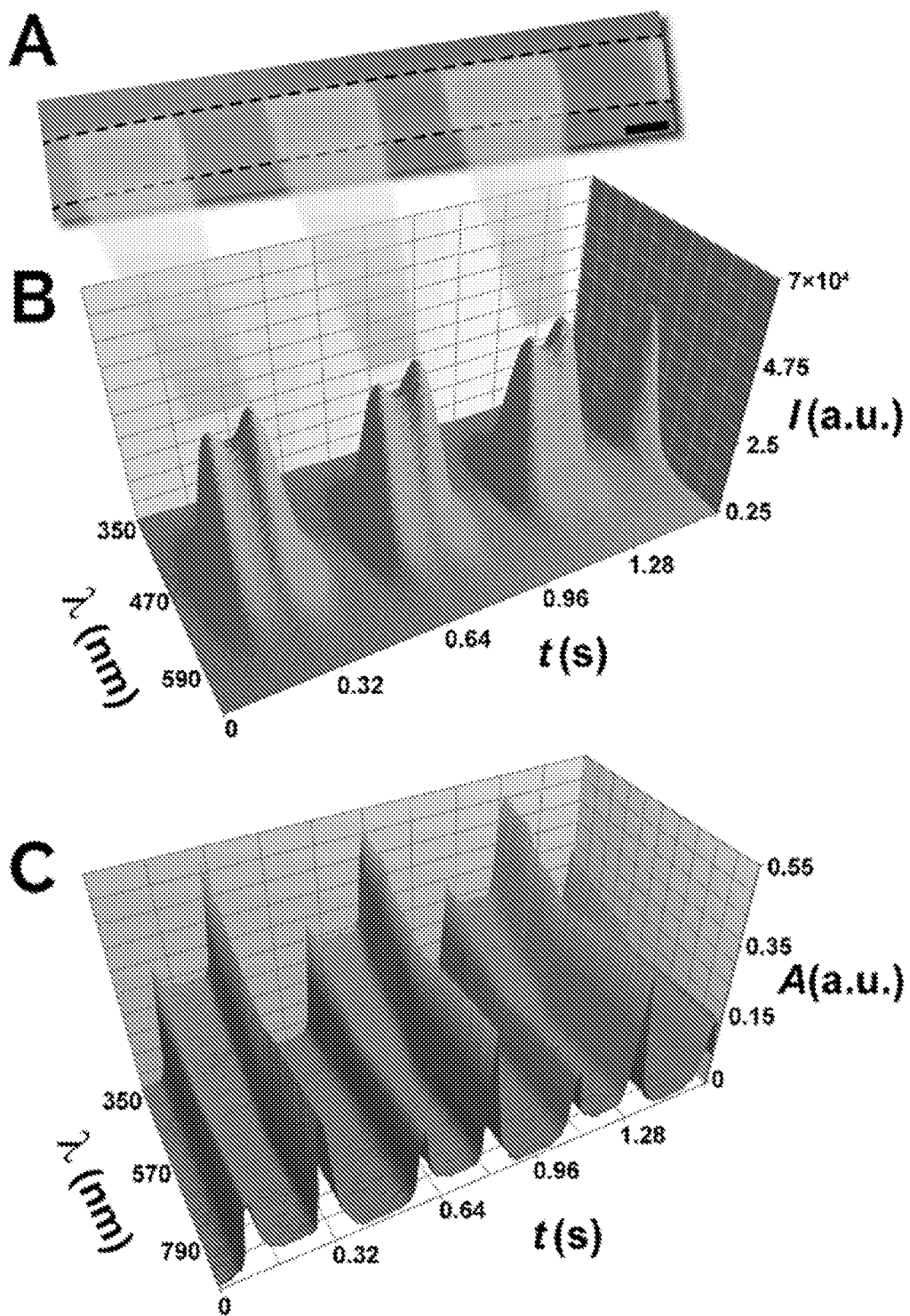
FIG. 10A-FIG. 10C.
Figure 18:
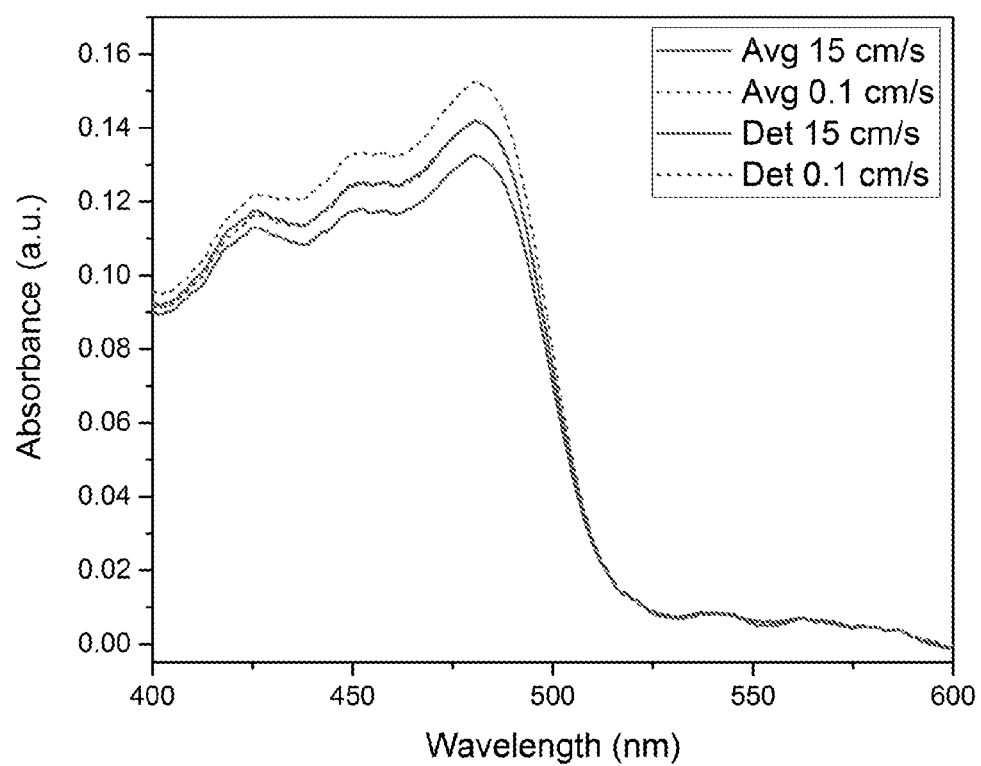
FIG. 18: Sample absorption spectra of saturated fluorescein in water obtained with different spectra selection methods and average fluid velocities. Averaged spectra (Avg) were taken across 60 continuously collected samples over ≥1 s, and plug detection algorithm spectra (Det) were taken from the ten estimated optimal spectra, as dictated by local variance calculations, within the same 60 samples. Averaged spectra were used to evaluate multi-phase conditions with average fluid velocities>1.1 cm/s, and the plug detection algorithm was applied to conditions ≤1.1 cm/s. An integration time of 15 ms was used for all spectra.

In a microscale multi-phase flow format, continuously obtained spectral data at every detection point changes significantly as different phases move across the sampling port (cf FIG. 10A-FIG. 10C). Not only do the corresponding photoluminescence and absorption spectra between the continuous (gas) and the dispersed (liquid) phases vary, but the refractive properties at their curved interface can substantially alter the resulting spectral data. Averaging spectra across multiple plugs is an acceptable response to this variability, and it is certainly a reasonable and necessary approach while operating at relatively high average velocities (FIG. 18).

Due to the required integration and script execution times (on the order of milliseconds), there is an inherent limitation on the number of spectra that may be obtained within a single moving plug. At average plug velocities higher than 1.1 cm/s, a plug detection method is no longer suitable for sample collection, and instead simply averaging across an evenly distributed set of samples becomes more applicable. FIG. 18 shows a sample set of absorption spectra demonstrating the necessity of this distinction. By indiscriminately averaging across a slowly moving plug, the arbitrary point in which sampling is initiated becomes the sole representation of the moving plug, and it does not effectively characterize the bulk solution within the moving liquid plug. In applying the plug detection methods to a quickly moving plug, local variance does not meaningfully represent the sample. Therefore, in order to efficiently and accurately perform sampling on multi-phase systems at variable flow rates, a combination of the two approaches is required.

Figure 19A:
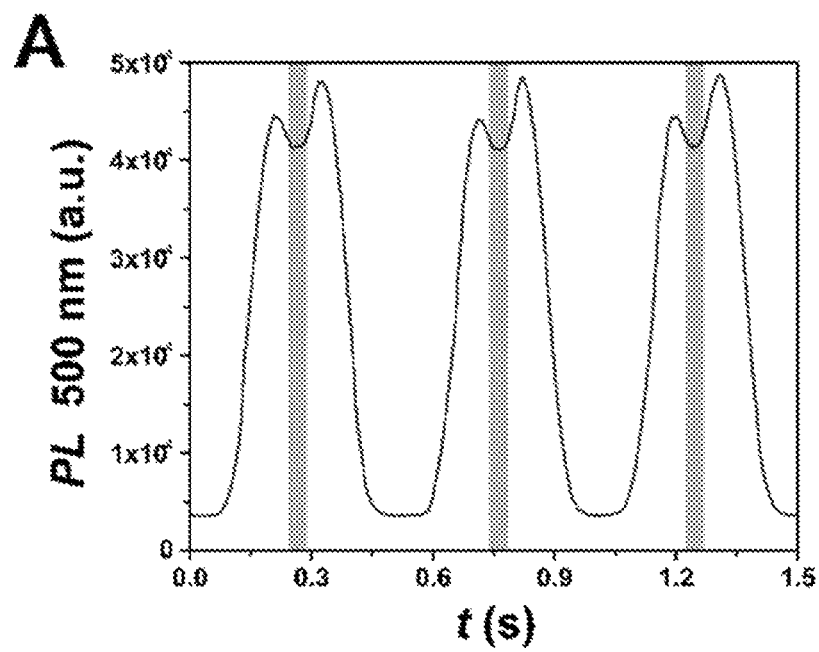
FIG. 19A-FIG. 19B: Single wavelength spectra intensities with optimal sample time spans for (FIG. 19A) photoluminescence at 500 nm and (FIG. 19B) absorbance at 380 nm. Spectra were collected at a single sampling port, and conditions correspond to those shown in FIG. 4 (Gas phase: pressurized nitrogen (10 psig) at $Q_G$=278 µL/min; liquid phase: toluene containing CsPbBr$_3$ quantum dots at $Q_L$=185 µL/min). Integration times of 4 ms and 15 ms were used for photoluminescence and absorption spectra, respectively.
Figure 19B:
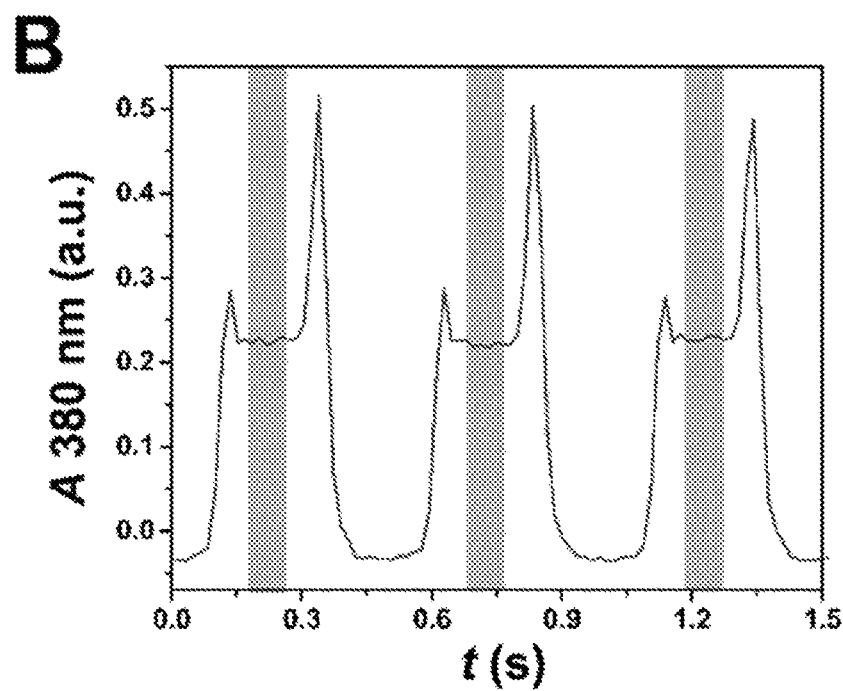

FIG. 19A-FIG. 19B shows the single intensity spectral data for a microscale multi-phase flow system over time for use in sample selection in the plug detection process. For both absorption (FIG. 19A) and photoluminescence (FIG. 19B) data, the system is characterized by a baseline reading within the gas phase, a sharp peak at the gas-plug interface, and a small plateau region within the plug itself. The plug detection script first discounts extrema associated with the carrier phase and interface, then it finds the ten samples with the lowest local (five point) variance, which are then averaged to obtain each tested condition spectra.

However, in lower plug velocity conditions, averaging spectra over a long integration time becomes a significant limitation in terms of sampling time and precision, as more time is required for an equivalent volume of liquid sample to pass the sampling point. To address this sampling constraint, spectral characterization in low flow rate systems ($U_{ave} \leq 11$ mm/s) implemented a plug detection algorithm, which applies local variance calculations to continuously sampled spectra in order to find the stabilized region within a single liquid plug. The plug detection scheme then selected the ten optimal spectra within the continuous sampling timespan and averaged them together (FIG. 18 and FIG.

19A-FIG. 19B). This technique enabled consistent and equivalent spectra collection in a fraction of the time required otherwise.

Figure 11:
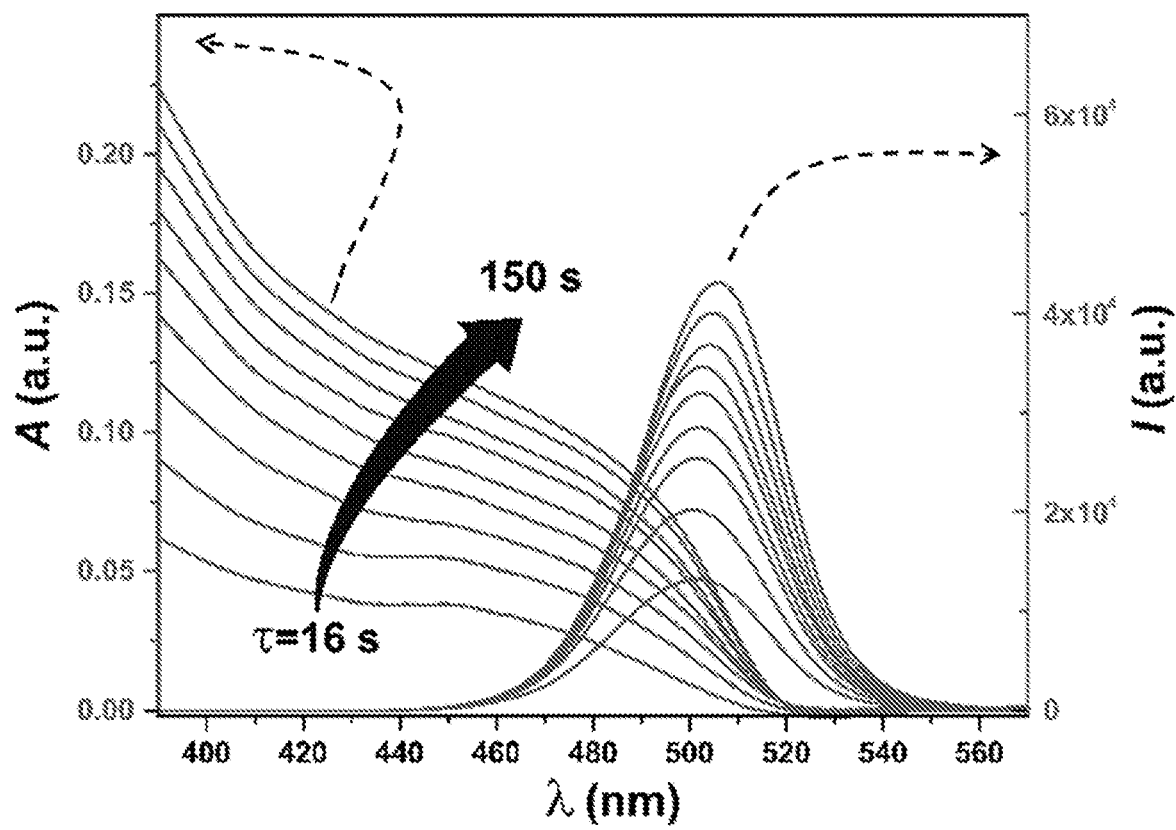
FIG. 11: Sample of in-situ obtained absorption and photoluminescence spectra of $CsPbBr_3$ quantum dots for a single total flow rate condition operated in the multi-phase flow format over multiple residence times (i.e., various sampling ports along the microreactor). Pressurized nitrogen (10 psig) was used as the continuous phase. Experimental conditions were $Q_1=32$ µL/min, $Q_2=5$ µL/min, $Q_G=52$ µL/min. Integration times of 4 ms and 15 ms were used for photoluminescence and absorption spectra, respectively. Maximum velocity of 5 cm/s was used for the periodic movement of the translational flow cell. Data were collected within a single pass of the translational flow cell.

Nanocrystal growth and proliferation can be monitored using the photoluminescence and absorption spectra obtained at a single pass of the translating flow cell at each equilibrated flow rate. FIG. 11 shows an example of in-situ obtained time-evolution of the absorption and photoluminescence spectra of $CsPbBr_3$ quantum dots synthesized at a constant average flow velocity, $U_{ave}$ of 1.8 mm/s. The temporal spectra data obtained at different residence times (i.e., different sampling ports) at a constant total average flow velocity ensures the obtained emission band-gaps and average concentration of the formed nanocrystals at different growth times are not affected by the variation in the degree of mixing. Thus, the translational three-port flow cell, for the first time, can provide spectral information regarding the synthesis of colloidal nanocrystals with similar mixing and mass transfer characteristics during the synthesis period. The increase in the absorbance of $CsPbBr_3$ quantum dots within the liquid plugs along the flow direction, shown in FIG. 11, corresponds to the increase in concentration (formation of new nuclei) over time. Growth of the area under photoluminescence curves further confirms the formation of more nanocrystals, while the gradual red-shift of the first excitonic peak wavelength of the absorption spectra as well as photoluminescence peak wavelength ($\lambda_P$) from 502 nm at 16 s to 507 nm at 150 s suggests a slow growth of the nanocrystals over longer reaction timescales than previously explored (Wei et al. *Chem. Commun.*, 2016, 52, 7265-7268; Protesescu et al. *J. Am. Chem. Soc.*, 2016, 138, 14202-14205).

Case Study: Effect of Mixing on the Formation of Perovskite Quantum Dots

Figures 12A, 12B, 12C:
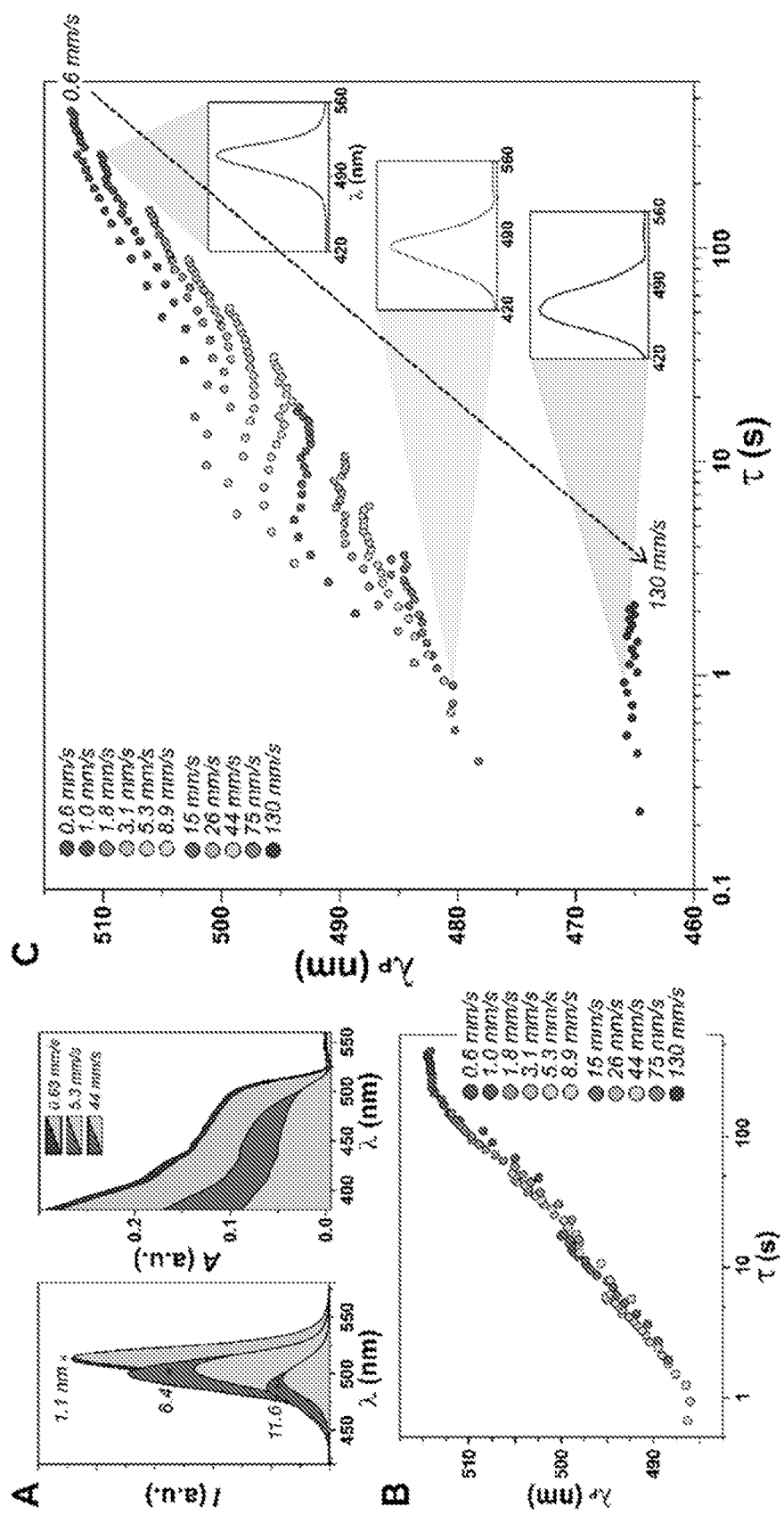
FIG. 12A-FIG. 12C.
Figures 13A, 13B, 13C, 13D:
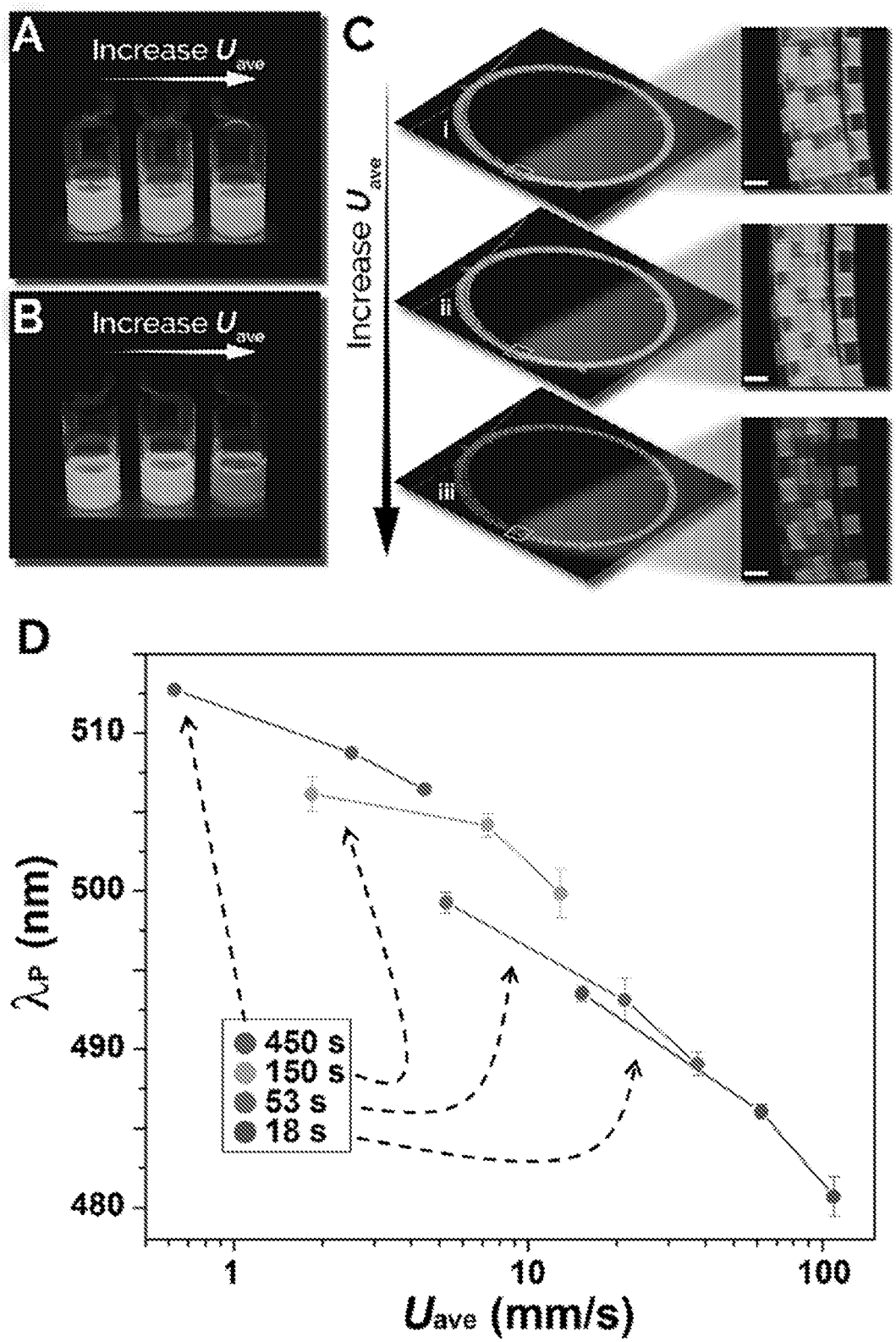
FIG. 13A-FIG. 13D: Fluorescence images of collected Colloidal $CsPbBr_3$ quantum dots under UV illumination, synthesized using the (FIG. 13A) single and (FIG. 13B) multi-phase flow formats at average flow velocities of 1.0, 3.1, and 15 cm/s through (FIG. 13C) 5 m of 1/16" FEP tubing with an ID of 0.04" (FIG. 13A and FIG. 13B images were taken approximately 30 min after synthesis, and FIG. 13C images were taken 15 s after halting flow). Scale bars are 2 mm (FIG. 13D) Illustration of the effect of inter-phase mixing timescale on the photoluminescence peak wavelength of $CsPbBr_3$ quantum dots as a function of the average flow velocity over four residence times using the multi-phase flow system. Each set of constant residence time data was sampled at reactor lengths of 28, 112, and 198 cm through the incorporation of extension modules. An integration time of 4 ms was used for the detection of photoluminescence peak wavelengths.
Figures 16A, 16B, 16C, 16D:
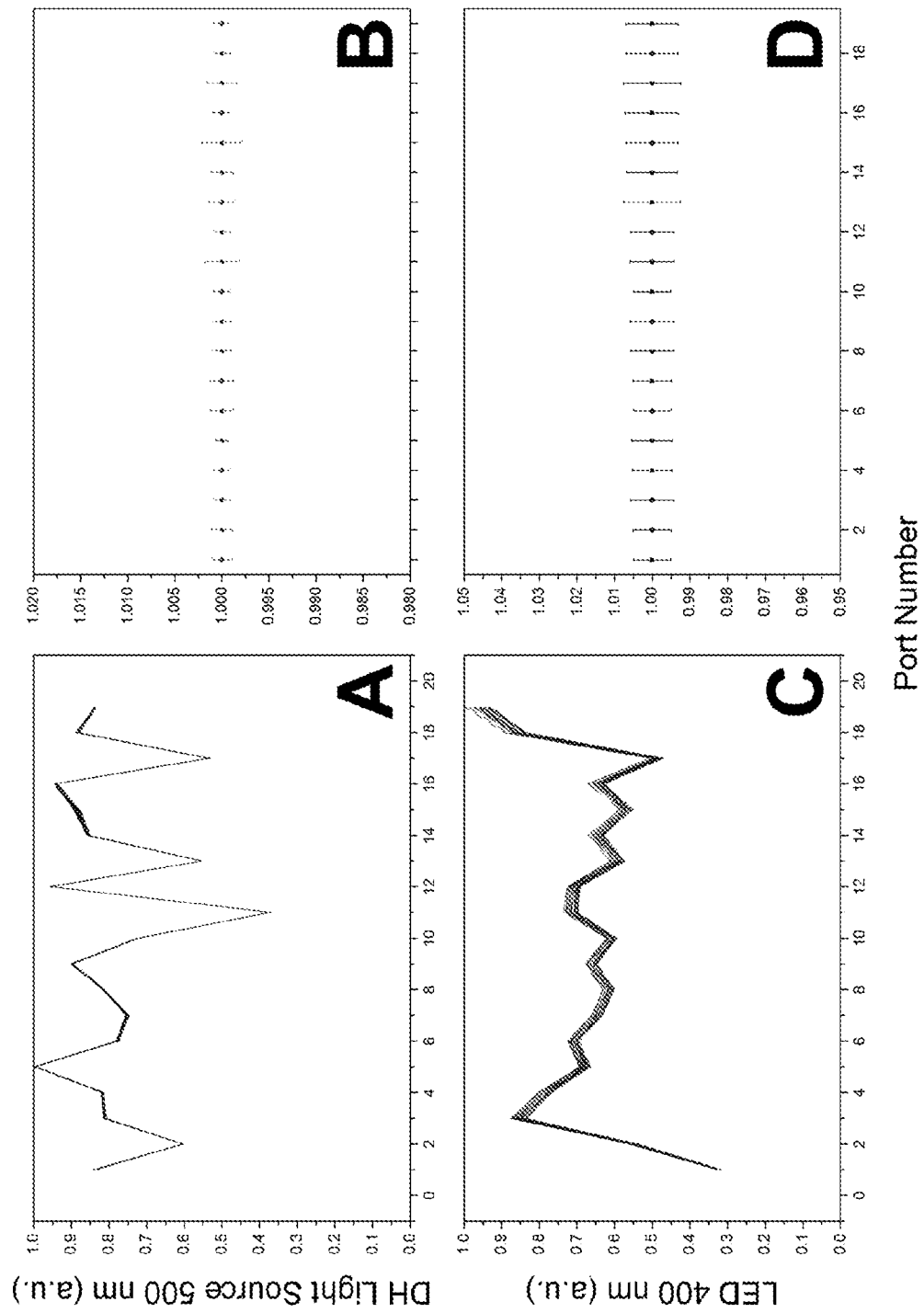
FIG. 16A-FIG. 16D: Demonstration of sampling consistency across stage movement.
Figures 17A, 17B, 17C, 17D:
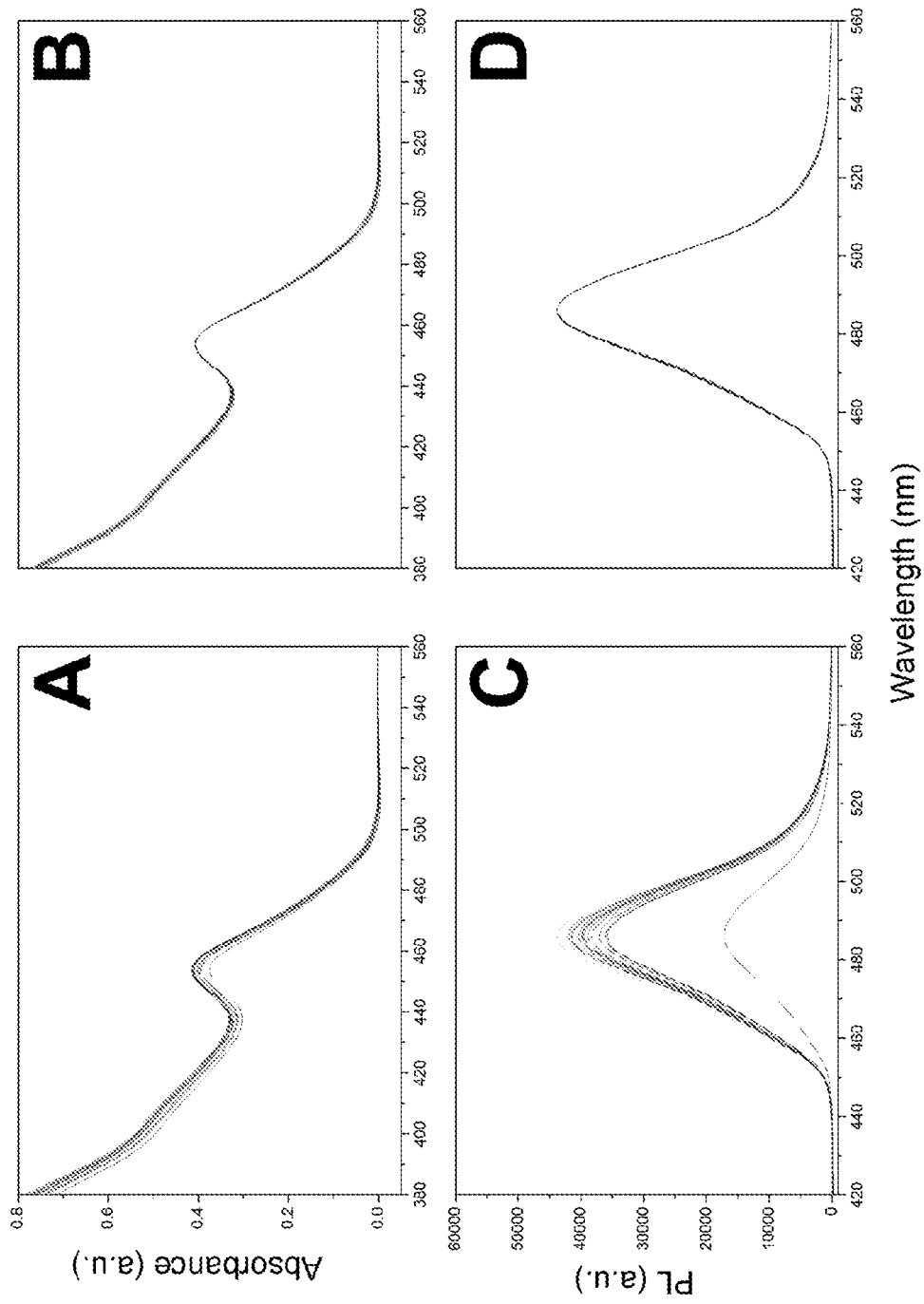
FIG. 17A-FIG. 17D: Demonstration of scalar pathlength correction by port location. Absorption spectra of a pre-synthesized CsPbBr$_3$ quantum dot sample in toluene over all twenty sampling ports (FIG. 17A) without and (FIG. 17B) with the pathlength correction. photoluminescence spectra of a pre-synthesized CsPbBr$_3$ quantum dot sample in toluene over all twenty sampling ports (FIG. 17C) without and (FIG. 17D) with the pathlength correction. The resulting scalar correction values averaged over five replicates were applied to spectra obtained during synthesis tests for each system configuration.
Figure 20A:
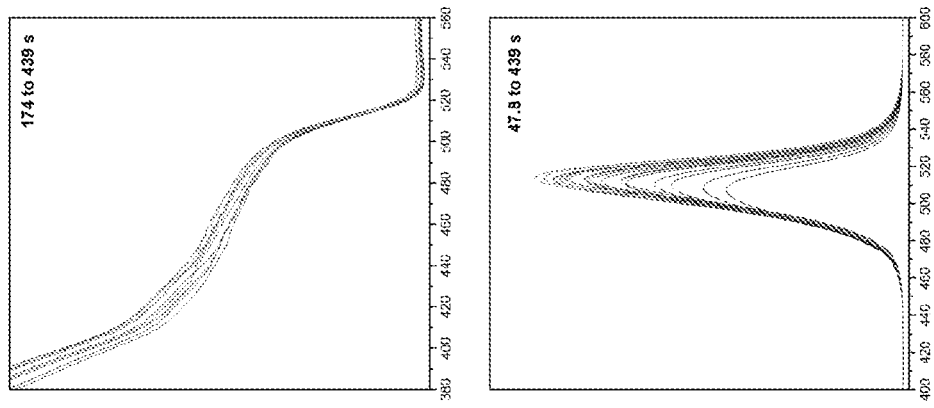
FIG. 20A-FIG. 20C: Sample absorption (top) and photoluminescence (bottom) spectra collected within a single pass of the translating flow cell for total flow rates of (FIG. 20A) 1220, (FIG. 20B) 85, and (FIG. 20C) 29 µL/min in a multi-phase flow CsPbBr$_3$ synthesis. Note that absorption spectra below the detection limit are excluded.
Figure 20B:
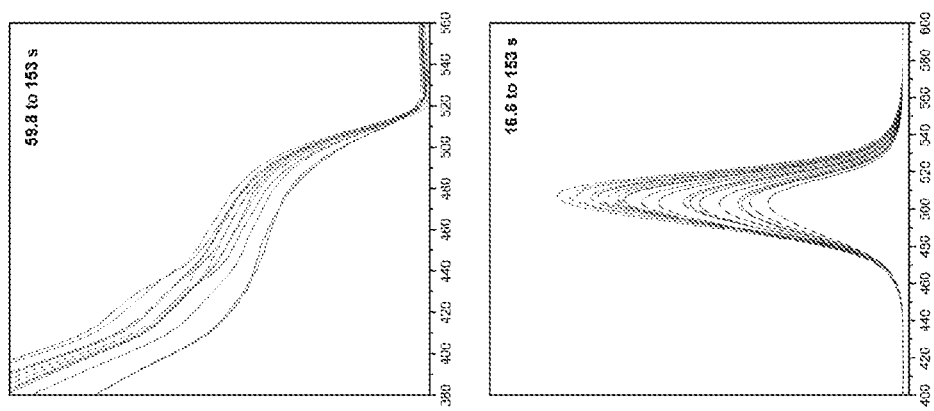
Figure 20C:
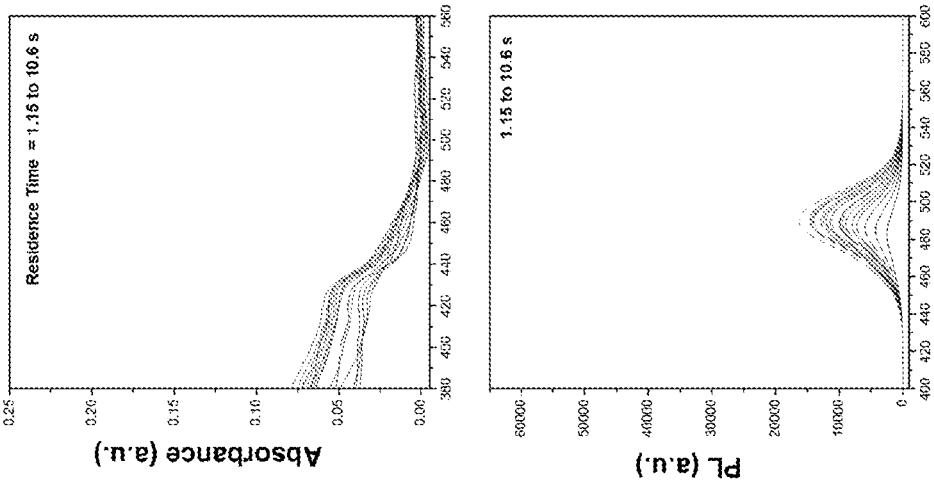

To demonstrate the versatility of the developed modular microfluidic platform, the translational three-port flow cell was utilized to study the effect of early stage mixing of precursors on the emission band-gap of $CsPbBr_3$ quantum dots. This relationship is demonstrated through several methods. First, as shown in FIG. 12A, absorption and photoluminescence spectra of in-flow synthesized $CsPbBr_3$ quantum dots at similar residence times (i.e., growth times) along the microreactor were compared between single and multi-phase flow formats. At the relatively low average flow velocity of 0.63 mm/s, corresponding to a residence time of 450 s, only a slight $\lambda_P$ difference of 1.1 nm was observed between the single and multi-phase flow formats, suggesting similar mixing characteristics for both systems. But, as the average flow velocity was increased to 44 mm/s, the variation of photoluminescence peak wavelength between the single and multi-phase flow formats became an order of magnitude larger, increasing to a 11.6 nm difference at a residence time of 6.2 s. Furthermore, the corresponding absorption spectra demonstrated a higher $CsPbBr_3$ concentration (absorbance) when transitioned to multi-phase flow at a similar residence time. The results shown in FIG. 12A suggest that inter-phase mixing and mass transfer characteristics greatly influence the emission band-gap and concentration of the synthesized $CsPbBr_3$ quantum dots. As the average flow velocity decreases, mass transfer within both single and multi-phase flow systems becomes closer to the diffusive regime, however, by increasing the average flow velocity, the convective mixing due to the formed recirculatory patterns within the multi-phase plugs begins to significantly enhance inter-phase mixing, further separating multi-phase nanocrystal properties from that of equivalent single-phase systems. The enhanced mixing characteristics offered by multi-phase flow enables the production of a higher bulk concentration of blue-shifted particles compared to that found in single-phase products (FIG. 12A). Capitalizing on the modularity of the designed microfluidic platform, the same in-situ screening of the colloidal synthesis of $CsPbBr_3$ quantum dots, shown in FIG. 12A, can be conducted at any arbitrarily selected reactor length varying between 3 to 300 cm. This phenomenon is further demonstrated with an extensive screening of the $\lambda_P$ at similar average flow velocities across both single and multi-phase systems, shown in FIG. 12B and FIG. 12C, respectively. An example of three sets of in-situ obtained absorption and photoluminescence spectra of $CsPbBr_3$ quantum dots is shown in FIG. 20A-FIG. 20C. As expected, no significant difference was observed between the photoluminescence peak wavelength of $CsPbBr_3$ quantum dots in single-phase flow systems at equivalent residence times across variable average flow velocities. Thus, a continuous relationship between residence time and emission band-gap of $CsPbBr_3$ quantum dots was observed in single-phase flow systems (FIG. 12B). Testing in multi-phase flow, however, demonstrated a far greater impact of the average fluid velocity on the emission band-gap of $CsPbBr_3$ quantum dots. Perovskite nanocrystals synthesized in multi-phase flow systems followed significantly distinct growth paths across different average flow velocities (FIG. 12C). As can be seen in FIG. 12C, higher average flow velocities (i.e., faster mixing timescales) produced quantum dots with a lower photoluminescence peak wavelength corresponding to a higher emission band-gap. A photoluminescence peak wavelength difference as great as 25 nm at equivalent residence times was observed for $CsPbBr_3$ quantum dots synthesized using different average flow velocities in the multi-phase flow system.

Figure 21:
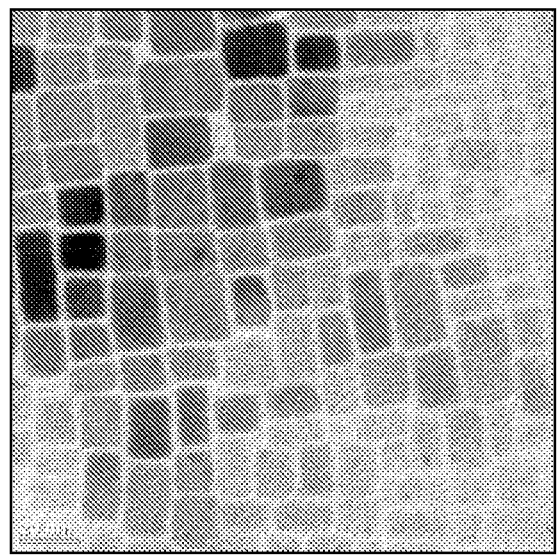
FIG. 21: Scanning Transmission Electron Microscopy (STEM) image of a sample of in-flow synthesized CsPbBr$_3$ quantum dots using the multi-phase flow format ($Q_G$=465; $Q_1$=268; $Q_2$=42 µL/min) collected on the JEOL 2000FX through the Analytical Instrumentation Facility (AIF) of North Carolina State University. TEM sample was prepared by precipitating the crude perovskite solution with γ-butyrolactone, redispersion in toluene, then drop-casting onto a copper TEM grid (Ted Pella Inc., 200 Mesh Carbon Film).

The stability, dependency, and control of the emission band-gap of $CsPbBr_3$ quantum dots were further evaluated through the collection and imaging of flow samples, shown in FIG. 13A-FIG. 13D. Synthesized $CsPbBr_3$ quantum dots using single phase flow format at different values of $U_{ave}$ resulted in colloidal solutions with similar emission band-gaps (i.e., fluorescence colors), shown in FIG. 13A, that is consistent with the independence of the photoluminescence peak wavelength of $CsPbBr_3$ quantum dots to the average flow velocity of single-phase flow system shown in FIG. 12B. However, the synthesized $CsPbBr_3$ quantum dots using the multi-phase flow system (FIG. 21) resulted in distinct emission band-gaps at different average fluid velocities (i.e., different inter-phase mixing characteristics). Next, by applying variable reactor lengths within the automated microfluidic platform using the extension modules, the correlation between the average flow velocity of multi-phase flow systems and the photoluminescence peak wavelength of $CsPbBr_3$ quantum dots was studied, shown in FIG. 13D. This result further supports the claim that early mixing kinetics greatly influence the nucleation and growth pathway of perovskite nanocrystals as well as their physicochemical properties at later time scales. Thus, the quantum dot products of conventional batch synthesis approaches will have significant variability (FIG. 14A) due to variable mass transfer timescales and different Da values at early injection times across different scales (e.g., small vial vs. big flask). In contrast, the developed multi-phase microfluidic strategy provided consistent and reproducible mixing and mass transfer characteristics and was, therefore, capable of producing quantum dots with similar emission band-gaps at different throughputs (FIG. 14B).

Conclusions

In conclusion, a fully automated modular microfluidic platform for fundamental and applied studies of the large parameter space associated with the colloidal synthesis of semiconductor nanocrystals was designed and developed herein. The developed three-phase translational flow cell integrated with the modular microfluidic platform enabled access to a parameter space that was previously inaccessible using conventional microreactors. Using the modular microreactor setup, a rapid and effective characterization of the reaction conditions was demonstrated for a case study of $CsPbBr_3$ quantum dots. Data was collected at a rate and chemical consumption vastly superior to that of traditional batch screening methods, which enabled sampling to occur across a much wider range and higher frequency than what would be attainable otherwise. Through simultaneous collection of both absorption and photoluminescence spectra of $CsPbBr_3$ quantum dots along the full length of the microreactor, a more accurate representation of the nanocrystal growth at a constant flow velocity was established (i.e., similar inter-phase mixing timescale). In addition, in-situ spectral monitoring of controlled nanocrystal growth, across 4 orders of magnitude reaction timescales enabled the development of the correlation between the final nanocrystal properties (emission band-gap) and the early stage reaction kinetics. Utilizing the modular microfluidic platform, a kinetic phenomenon both inherent to the selected perovskite synthesis and vital to improving the understanding of certain nanocrystal formations was demonstrated.

The developed microfluidic platform allows for additional high-throughput characterization across a wide range of reaction conditions, including but not limited to gradient changes in precursor compositions and ratios as well as the synthesis temperature. The generalized format of the developed modular platform allows for the same system to be applied to screening additional colloidal nanocrystal syntheses (e.g., metal nanocrystals), enabling significantly improved material- and time-efficient characterization. Further application of the developed modular setup in conjunction with an effective numbered-up multi-phase flow platform would allow for an enhanced real-time optimization of the synthesis and optical properties of colloidal nanocrystals, thereby improving the rate of product optimization and discovery as well as the production quality in large-scale nano-manufacturing of semiconductor nanocrystals.

Example 2

Due to recent advancements in solution phase processing of organic/inorganic metal-halide perovskite nanocrystals (Protesescu et al. Nano Lett., 2015, 15, 3692-3696), the material class has quickly emerged as a potential low cost replacement for semiconductors in commercial photovoltaics (Saliba et al. Energy & Environmental Science, 2016, 9, 1989-1997) and light emitting diodes (LEDs) (Liu et al. Nat Photon, 2014, 8, 133-138), thereby inciting active research towards large-scale production methods. An effective platform for continuous nanomanufacturing of high quality perovskite nanocrystals would require precise band-gap tuning capabilities and consistent quantum yield optimization; however, unlike the synthesis of II-VI and IV-VI quantum dots, research in colloidal perovskites has yet to develop a fundamental and comprehensive understanding of the early stage nucleation and growth kinetics.

In response to this gap in the existing knowledge of perovskite formation, an automated microfluidic platform for systematic screening of nanocrystal formation in continuous flow—with a room-temperature synthesis of cesium-lead halide perovskites (Wei et al., Chem. Commun., 2016, 52, 7265-7268)—as it relates to residence time, mass transfer limitations (i.e. fluid velocity), and solvent composition is described herein. This modular screening platform (FIG. 8A) features a three-port flow cell with translation capability for in situ spectral characterization along the 30 cm length of the 0.04" inner diameter capillary microreactor segment. The design includes an adjustable flow cell, which allows for sampling of up to twenty different residence times at a single equilibrated flow rate. By capturing spectral data along the length of the reactor at constant flow rates, the progression of nanocrystal growth under varying mass transport conditions can be systematically studied. Furthermore, by pairing full LabVIEW automated control with the translating flow cell, the system can both minimize operator influence and continuously collect data far more quickly and efficiently than manual sampling techniques—with an average sampling rate of 600 conditions per hour and reactant consumption of 60 μL per condition.

Figure 22:
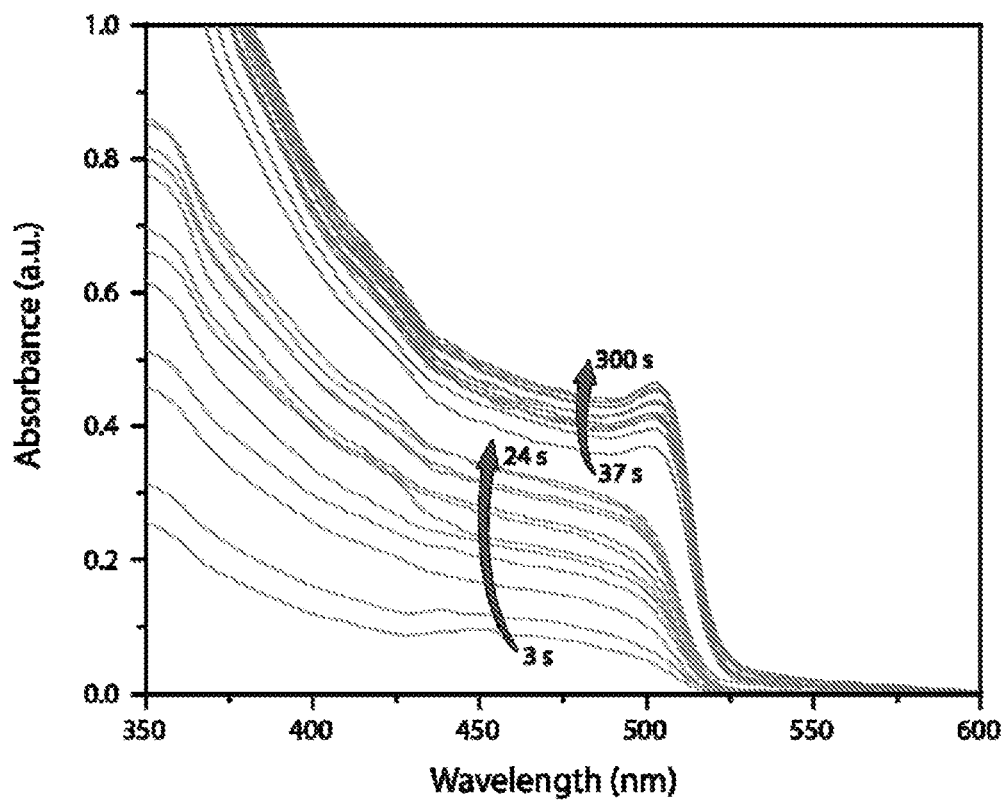
FIG. 22. In situ absorbance spectra for colloidal perovskites synthesized by combining a 10 mM cesium-lead solution and a 30 mM bromide solution with oleic acid in toluene at reactor flow rates of 530 µL/min (grey) and 44 µL/min (red) for residence time ranges of 3 to 24 sec and 37 to 300 sec respectively.
Figure 23:
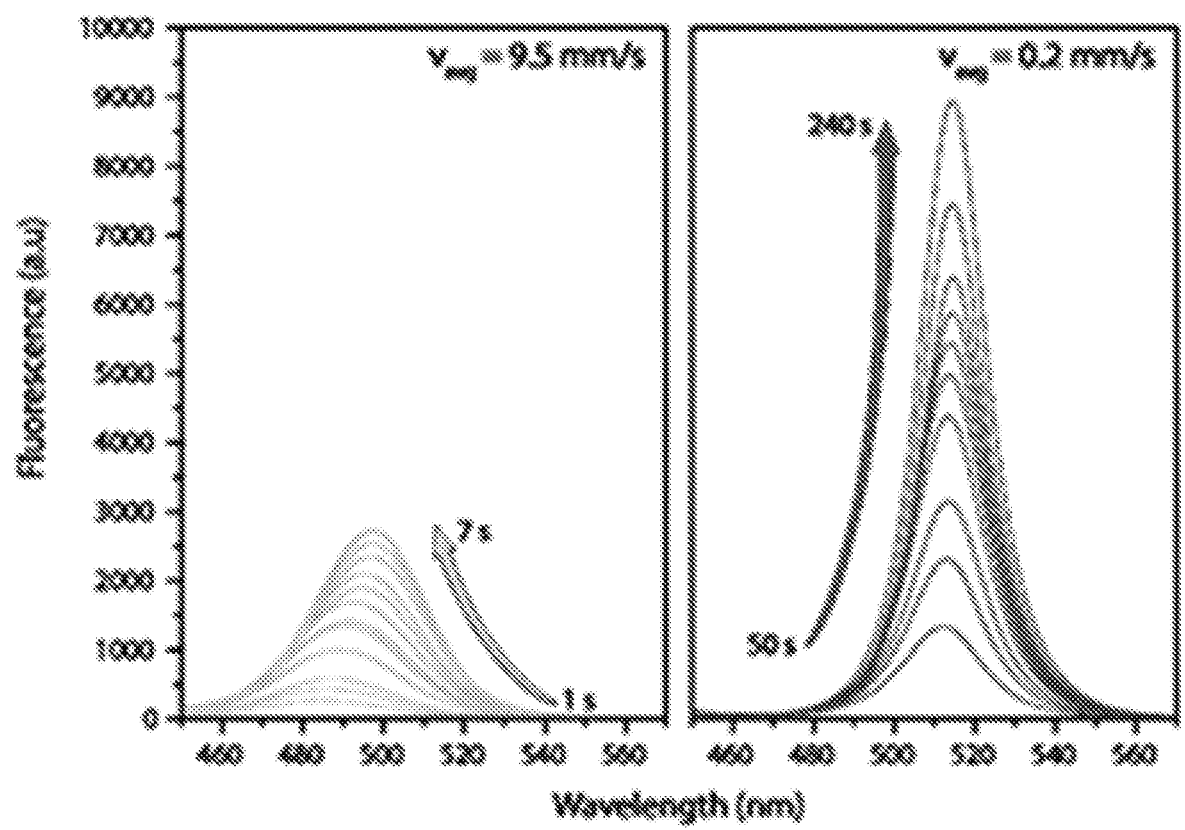
FIG. 23. In situ fluorescence spectra of colloidal perovskite reaction at reactor flow rates of 1854 µL/min (left) and 44 µL/min (right) for residence time ranges of 1 to 7 sec and 37 to 300 sec respectively FIG. 24. Fluorescence peak wavelength (left axis) and full width half maximum (right axis) as a function of residence time compiled across four flow rates: (1854 µL/min (blue), 530 µL/min (red), 120 µL/min (green), and 44 µL/min (yellow), with three term exponential fitting for each.
Figure 24:
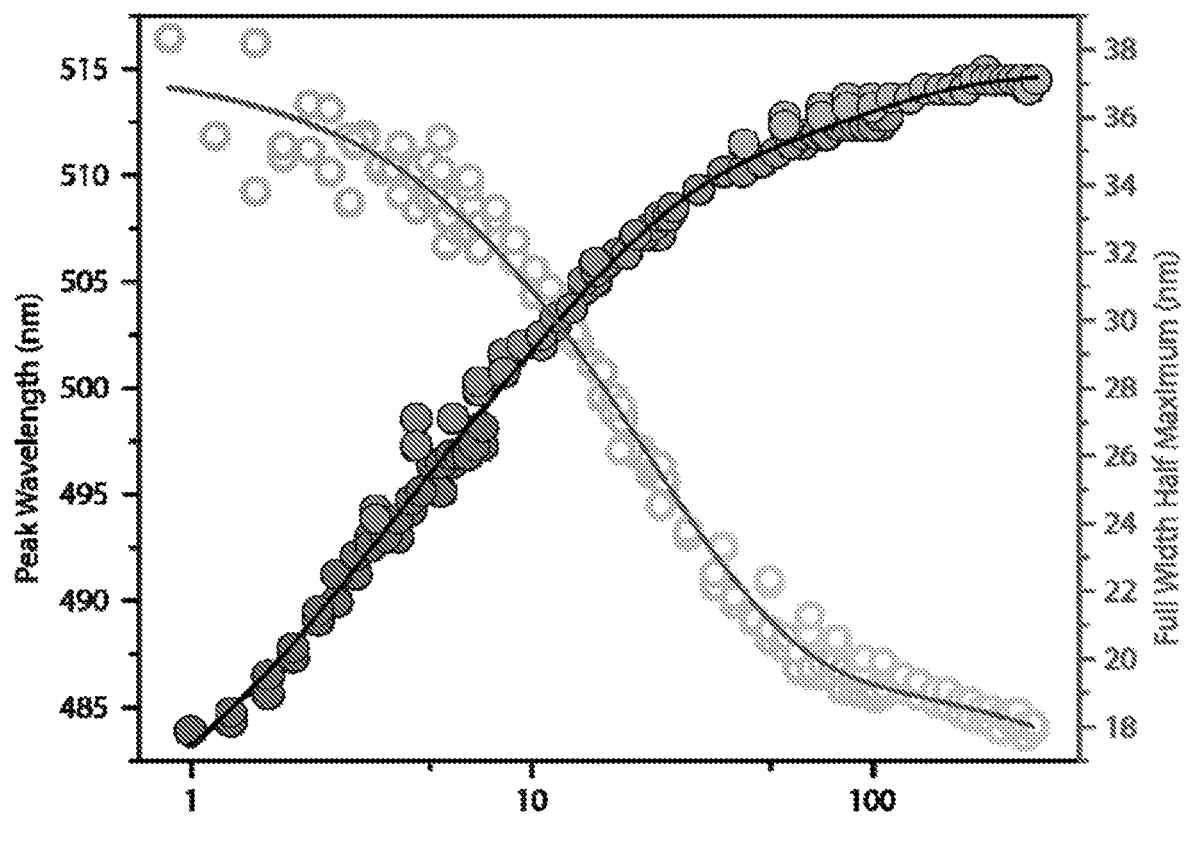
Figure 25:
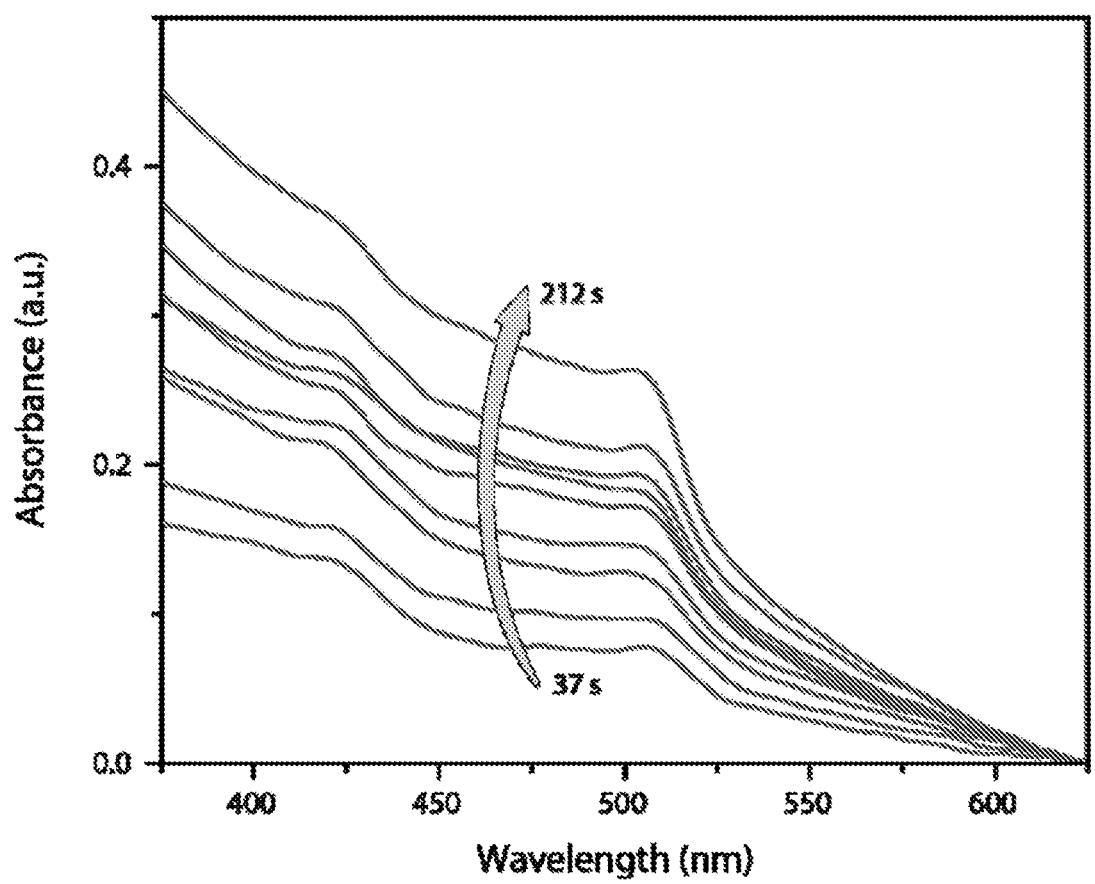
FIG. 25. In situ absorbance spectra for the same colloidal perovskite synthesis—see FIG. 22—with chloroform replacing toluene as the solvent at a 44 µL/min flow rate.

Four flow rate conditions were tested on the system to collect spectral data with associated residence times ranging from 1 sec to 5 min. The resulting absorbance (FIG. 22) and fluorescence (FIG. 23) spectra demonstrate the complete progression of crystal growth across that time scale, with some deviations occurring due to differences in fluid velocity. FIG. 23, for example, shows the fluorescence peak progression at one high and one low feed flow rate. The high flow rate peak growth develops more quickly than in the low flow rate system, which suggests that crystal formation in the slower moving system undergoes some mass transfer limitations. Consistent crystal growth between sampled flow rates is indicated by the fluorescence peak wavelength shift and decreasing full width half maximum (FWHM) shown over the full range of tested residence times (FIG. 24). The peak wavelength development confirms the progression of crystal growth as it moves from 515 to 485 nm for 1 sec and 5 min residence times respectively. The decreasing FWHM indicates a narrowing size distribution among the nanocrystal population as it moves from 38 nm to the low 18 nm reported in prior literature (Wei et al. Chem. Commun., 2016, 52, 7265-7268). Further characterization of the synthesis was performed by trading the toluene solvent for chloroform and repeating the process (FIG. 25).

Example 3

The developed modular microfluidic technology can also be utilized for continuous flow chemistry applications including material- and time-efficient screening, discovery, and optimization of solution-phase synthesis of organic molecules as well as scaled-up continuous manufacturing of the target molecules.

The modular microreactor can be reconfigured for both single- and multi-step organic synthesis chemistries with different temperatures and reaction times at each synthesis step for continuous synthesis of organic molecules at a desired yield and selectivity.

In addition to in-situ fluorescence, UV-Vis, Near-IR, and IR spectral characterization tools, the modular reactor can be reconfigured for in-line characterization of organic molecules using chromatography techniques including HPLC (High-pressure liquid chromatography), UPLC (Ultra-pressure liquid chromatography), GC (Gas chromatography), and MS (mass spectroscopy).

Example 4

Figure 26A:
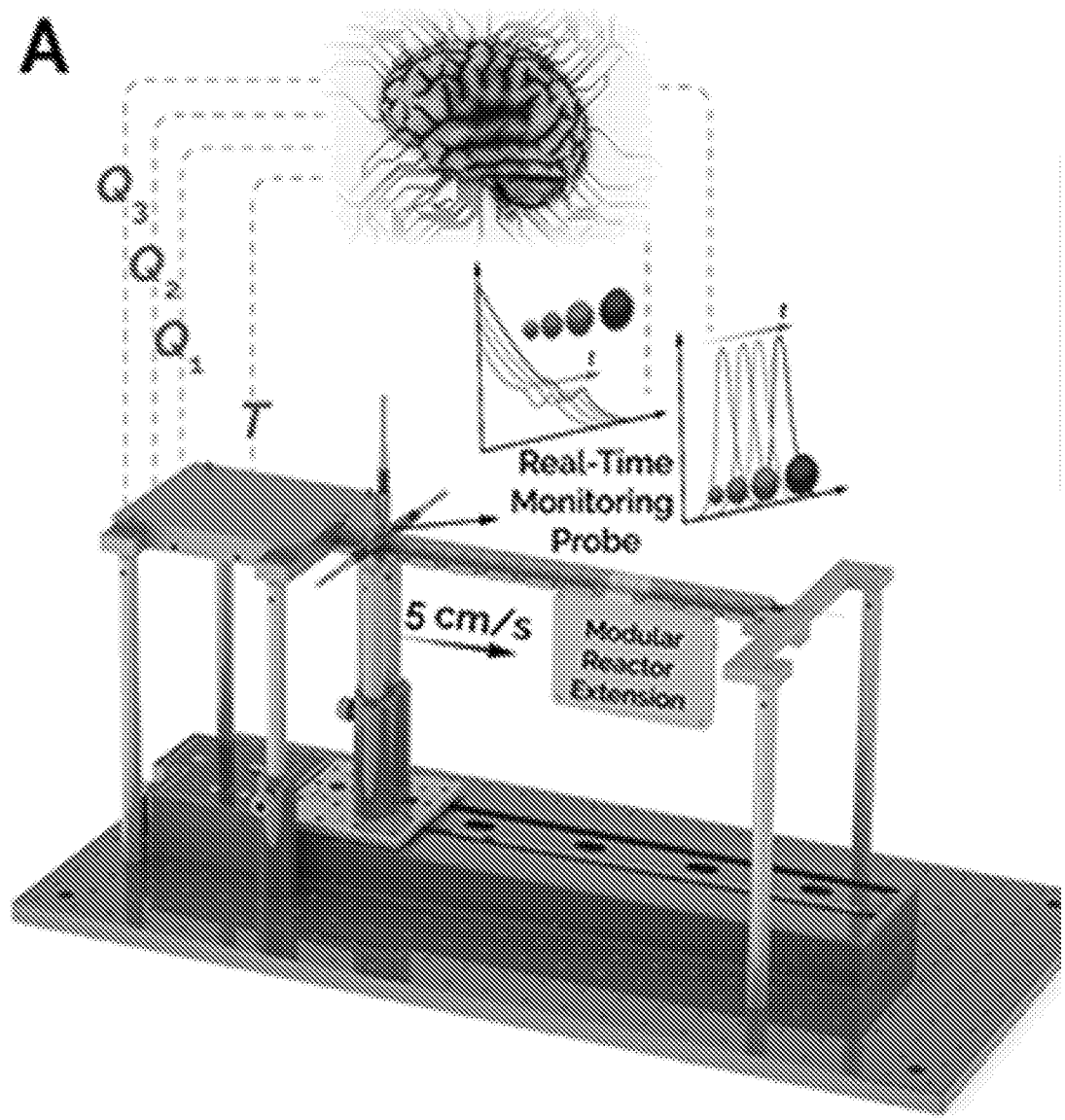
FIG. 26A-FIG. 26B.
Figure 26B:
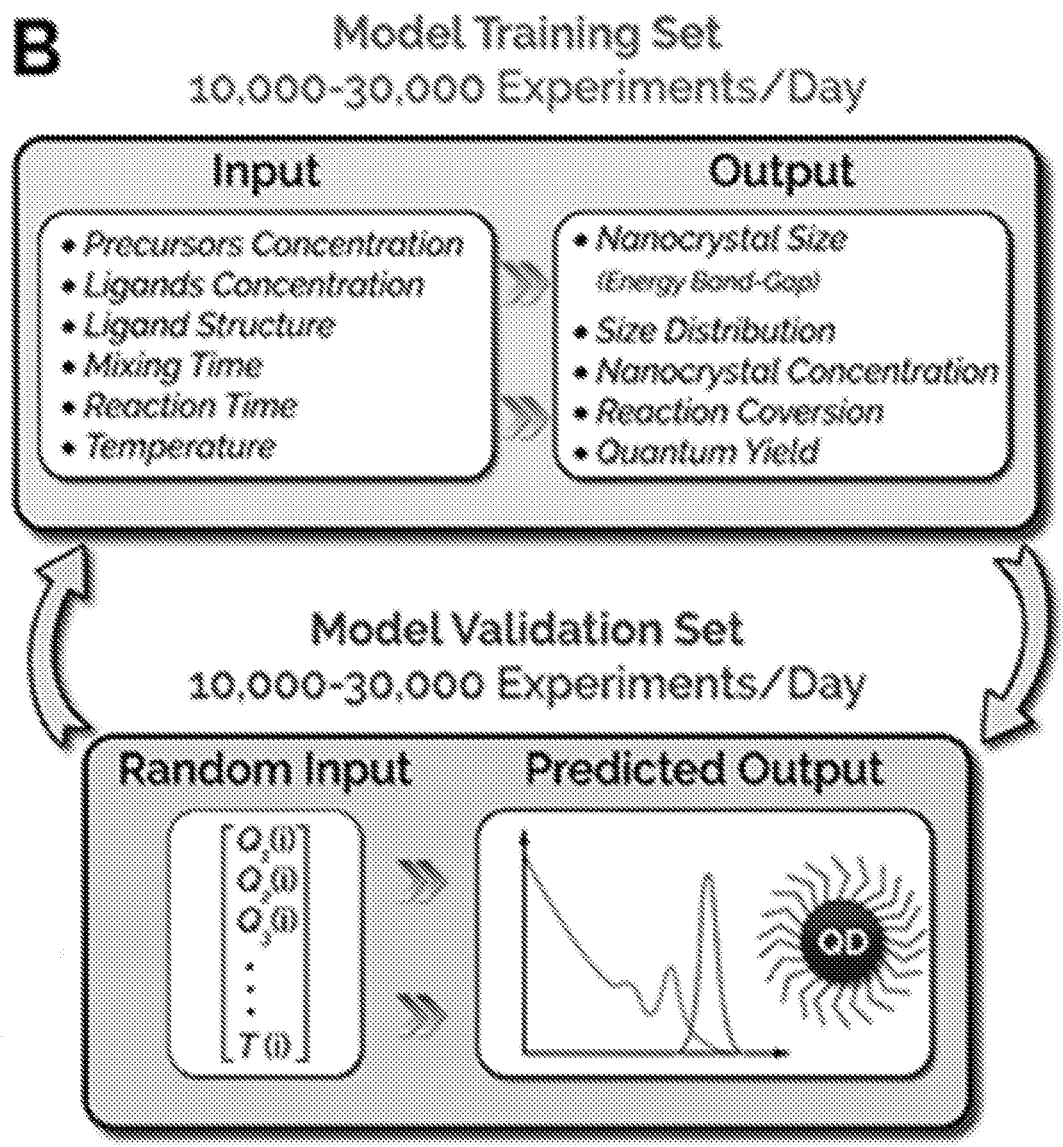
Figure 27:
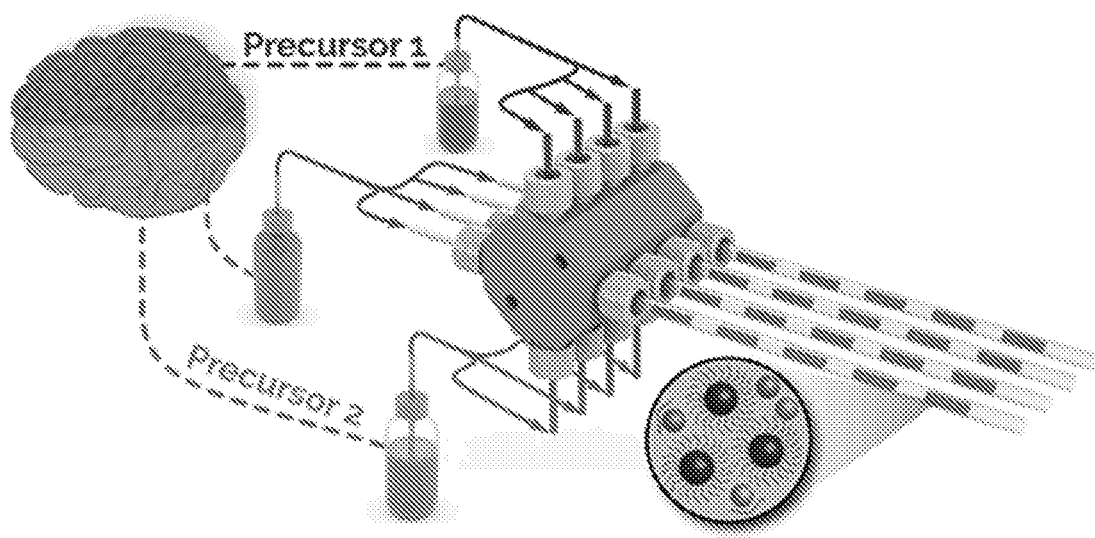
FIG. 27: Schematic of the numbered-up fluidic manufacturing technology for continuous synthesis of colloidal nanocrystals.

An autonomous robotic flow reactor, shown in FIG. 26A, can be utilized for studies of the nucleation and growth stages of colloidal nanocrystals (metal or semiconductor). Real-time spectroscopic data can be analyzed using artificial intelligence (AI) methods (e.g., *Convolutional Neural Networks*). The optimum size and size distribution control of quantum dots (QDs) can be targeted by searching through a broad range of experimental inputs (e.g., precursors ratio, ligand concentration, reaction temperature, reaction time, precursors reactivity, and nucleation and growth kinetics) (FIG. 26B). The intelligent fluidic nano-manufacturing approach can leverage machine learning and AI methods to rapidly converge on a scalable reaction that yields highly monodispersed nanocrystals precisely engineered for highly efficient single- and multi-junction solar cells (FIG. 27).

The modularity of flow reactors allows colloidal synthesis reactions to be readily scaled up from 10 g/hr throughput to 1 kg/hr using multiple parallel fluidic reactors (i.e., numbered-up strategy). For example, flow reactor comprising 100 channels per module can scale nanocrystal production to a throughput of ~100 ton/yr using 10 modules. In addition, the continuous in series operations of quantum dot synthesis, purification, and ligand exchange using such a reactor can result in an unprecedented process intensification in the synthesis of high quality colloidal nanocrystals. Syringe-free pumps can be utilized in the flow reactor system for uninterrupted continuous manufacturing of colloidal nanocrystals. A precursor distribution module (e.g., CNC machined or 3D-printed) can uniformly distribute the nanocrystal precursors into 100 microreactor channels for the large scale (i.e., numbered up) manufacturing of colloidal nanocrystals.

Figures 28A, 28B, 28C, 28D:
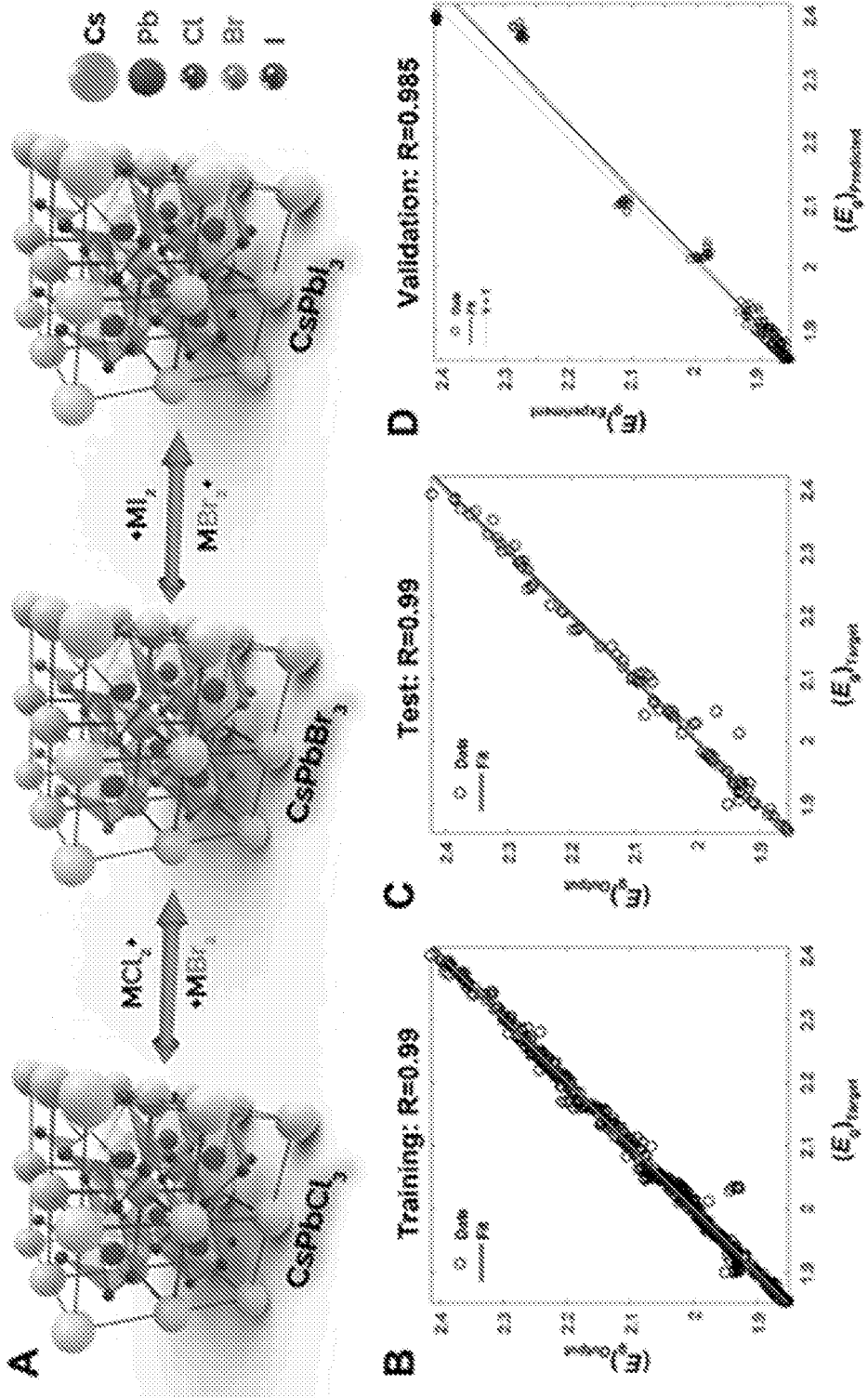
FIG. 28A-FIG. 28D.

FIG. 28A-FIG. 28D shows the integration of feed forward neural network algorithms with the big data of colloidal perovskite quantum dots (QDs) generated using the autonomous flow reactor (FIG. 26A-FIG. 26B). For example, FIG. 28B-FIG. 28C show Bayesian regularization training method using NeuroSolutions AI toolbox in MATLAB applied to 800 experimentally obtained perovskite quantum dot bandgaps (in situ fluorescence spectroscopy) over the course of in flow anion exchange reactions. FIG. 28D shows the performance of the trained neural network in predicting the emission bandgap of perovskite quantum dots against 130 experiments not seen (trained or tested), previously.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A continuous flow device for preparing a sample, the device comprising:
    a sample conduit providing a path for continuous fluid flow extending from a sample inlet to a sample outlet;
    a thermal housing enclosing the sample conduit, wherein the thermal housing comprises a plurality of measurement regions;
    a detector configured to capture a spectroscopic signal from the sample conduit at one or more of the plurality of measurement regions; and
    a motorized stage translatable along the thermal housing from a first location to a second location, wherein the detector is coupled to the motorized stage such that the motorized stage is configured to translate the detector along the thermal housing to align the detector with one or more of the plurality of measurement regions;
    wherein the device is configured to continuously flow a fluid precursor sample from the sample inlet to the sample outlet, the fluid precursor sample comprising a first precursor and a second precursor, such that the first precursor reacts with the second precursor as the fluid precursor sample continuously flows from the sample inlet to the sample outlet to form the sample before reaching the sample outlet;
    wherein the sample comprises a plurality of particles or an organic molecule.

2. The device of claim 1, wherein the sample conduit comprises one or more modules, wherein each of the one or more modules comprises a continuous fluid flow path of a first predetermined length such that the sample conduit is configured to have a continuous path for continuous fluid flow of a second predetermined desired length by fluidly connecting one or more modules.

3. The device of claim 1, wherein the thermal housing is formed from a metal.

4. The device of claim 1, wherein the plurality of measurement regions comprise a plurality of voids, a plurality of windows comprising a substantially spectroscopically transparent material, or a combination thereof, such that the plurality of measurement regions are substantially spectroscopically transparent.

5. The device of claim 1, wherein the device further comprises a computing device comprising a processor and a memory operably coupled to the processor, the memory having further computer-executable instructions stored thereon that, when executed by the processor, cause the processor to:
    a. translate the motorized stage along the thermal housing to such that the detector is aligned at a first location proximate a first measurement region;
    b. capture a first spectroscopic signal via the detector at the first location proximate the first measurement region, wherein the first spectroscopic signal has a first intensity;
    c. store the first spectroscopic signal and/or the intensity of the first spectroscopic signal;
    d. output the first spectroscopic signal and/or the intensity of the first spectroscopic signal;
    e. translate the motorized stage along the thermal housing from the first location proximate the first measurement region to a second location proximate the first measurement region;

f. capture a second spectroscopic signal via the detector at the second location proximate the first measurement region, wherein the second spectroscopic signal has a second intensity;

g. store the second spectroscopic signal and/or the intensity of the second spectroscopic signal;

h. output the second spectroscopic signal and/or the intensity of the second spectroscopic signal;

i. compare the intensity of the first spectroscopic signal to the intensity of the second spectroscopic signal;

j. repeat steps a-i to find the location at which the intensity of the spectroscopic signal is largest, thereby determining the location of the first measurement region; and k. output the location of the first measurement region.

6. The device of claim 5, wherein the processor is further configured to repeat steps a-k to determine and output the location of a second measurement region.

7. The device of claim 1, further comprising a sample preparation element fluidly connected to the sample inlet, wherein the sample preparation element comprises:

a chamber for sample mixing, the chamber comprising a first inlet, a second inlet, and an outlet, wherein the first inlet, the second inlet, and the outlet are fluidly connected via the chamber and the outlet is fluidly connected to the sample inlet;

a first precursor conduit fluidly connecting a first precursor inlet to the first inlet of the chamber; and a second precursor conduit fluidly connecting a second precursor inlet to the second inlet of the chamber.

8. The device of claim 7, wherein the device further comprises a computing device comprising a processor and a memory operably coupled to the processor, the memory having further computer-executable instructions stored thereon that, when executed by the processor, cause the processor to:

a. inject an amount of the first precursor from a first precursor reservoir into the first precursor conduit via the first precursor inlet and inject an amount of the second precursor from a second precursor reservoir into the second precursor conduit via the second precursor inlet, thereby forming the fluid precursor sample in the chamber;

b. set the temperature of the thermal housing to a first temperature;

c. inject the fluid precursor sample from the chamber into the sample conduit at a first flow rate via the sample inlet;

d. translate the motorized stage along the thermal housing to a first measurement region;

e. capture a spectroscopic signal from the sample within the sample conduit at the first measurement region;

f. analyze the spectroscopic signal to determine a property of the sample;

g. output the spectroscopic signal and/or the property of the sample;

h. compare the captured spectroscopic signal and/or the property of the sample to an input parameter;

i. when the input parameter is different than the captured spectroscopic signal and/or the property of the sample: translate the motorized stage along the thermal housing to a second measurement region and repeat steps e-h; adjust the amount of the first precursor, the amount of the second precursor, the temperature of the thermal housing, the first flow rate, or a combination thereof, and repeat steps a-h; or a combination thereof;

and j. when the input parameter and the captured spectroscopic signal and/or the property of the sample are the same: output the amount of the first precursor injected, the amount of the second precursor injected, the temperature of the thermal housing, the location of the measurement region, the captured spectroscopic signal, the property of the sample, the first flow rate, or a combination thereof.

9. The device of claim 8, wherein:

the sample comprises a plurality of particles and the property of the sample and/or the input parameter comprises the fluorescence of the plurality of particles, the absorption of the plurality of particles, the average particle size of the plurality of particles, the concentration of the plurality of particles within the sample, the monodispersity of the plurality of particles, or a combination thereof; or the sample comprises an organic molecule and the property of the sample and/or the input parameter comprises the fluorescence of the organic molecule, the absorption of the organic molecule, the identity of the organic molecule, the concentration of the organic molecule within the sample, or a combination thereof.

10. The device of claim 7, wherein the device further comprises a chromatograph fluidly coupled to the sample outlet and a computing device comprising a processor and a memory operably coupled to the processor, the memory having further computer-executable instructions stored thereon that, when executed by the processor, cause the processor to:

a. inject an amount of the first precursor from a first precursor reservoir into the first precursor conduit via the first precursor inlet and inject an amount of the second precursor from a second precursor reservoir into the second precursor conduit via the second precursor inlet, thereby forming the fluid precursor sample in the chamber;

b. set the temperature of the thermal housing to a first temperature;

c. inject the fluid precursor sample from the chamber into the sample conduit at a first flow rate via the sample inlet;

d. capture a chromatographic signal from the sample at the sample outlet via the chromatograph;

e. analyze the chromatographic signal to determine a property of the sample;

f. output the chromatographic signal and/or the property of the sample;

g. compare the captured chromatographic signal and/or the property of the sample to an input parameter;

h. when the input parameter is different than the captured chromatographic signal and/or the property of the sample: adjust the amount of the first precursor, the amount of the second precursor, the temperature of the thermal housing, the first flow rate, or a combination thereof, and repeat steps a-g;

and i. when the input parameter and the captured chromatographic signal and/or the property of the sample are the same: output the amount of the first precursor injected, the amount of the second precursor injected, the temperature of the thermal housing, the captured chromatographic signal, the property of the sample, the first flow rate, or a combination thereof.

11. The device of claim 10, wherein:
the sample comprises a plurality of particles and the property of the sample and/or the input parameter comprises the fluorescence of the plurality of particles, the absorption of the plurality of particles, the average particle size of the plurality of particles, the concentration of the plurality of particles within the sample, the monodispersity of the plurality of particles, or a combination thereof; or
the sample comprises an organic molecule and the property of the sample and/or the input parameter comprises the fluorescence of the organic molecule, the absorption of the organic molecule, the identity of the organic molecule, the concentration of the organic molecule within the sample, or a combination thereof.

12. The device of claim 1, wherein the device further comprises a computing device comprising a processor and a memory operably coupled to the processor, the memory having further computer-executable instructions stored thereon that, when executed by the processor, cause the processor to:
a. inject the fluid precursor sample into the sample conduit at a first flow rate via the sample inlet;
b. set the temperature of the thermal housing to a first temperature;
c. translate the motorized stage along the thermal housing to a first measurement region;
d. capture a spectroscopic signal from the sample within the sample conduit at the first measurement region;
e. analyze the spectroscopic signal to determine a property of the sample; and
f. output the spectroscopic signal, the property of the sample, the temperature of the thermal housing, or a combination thereof.

13. The device of claim 12, wherein the computer-executable instructions stored thereon that, when executed by the processor, further cause the processor to: repeat steps a-e at a second measurement region.

14. The device of claim 12, wherein:
the sample comprises a plurality of particles and the property of the sample and/or the input parameter comprises the fluorescence of the plurality of particles, the absorption of the plurality of particles, the average particle size of the plurality of particles, the concentration of the plurality of particles within the sample, the monodispersity of the plurality of particles, or a combination thereof; or
the sample comprises an organic molecule and the property of the sample and/or the input parameter comprises the fluorescence of the organic molecule, the absorption of the organic molecule, the identity of the organic molecule, the concentration of the organic molecule within the sample, or a combination thereof.

15. The device of claim 1, further comprising a chromatograph fluidly coupled to the sample outlet.

16. The device of claim 15, wherein the device further comprises a computing device comprising a processor and a memory operably coupled to the processor, the memory having further computer-executable instructions stored thereon that, when executed by the processor, cause the processor to:
a. inject the fluid precursor sample into the sample conduit at a first flow rate via the sample inlet;
b. set the temperature of the thermal housing to a first temperature;
c. capture a chromatographic signal from the sample at the sample outlet via the chromatograph;
d. analyze the chromatographic signal to determine a property of the sample; and
e. output the chromatographic signal, the property of the sample, the temperature of the thermal housing, or a combination thereof.

17. The device of claim 16, wherein:
the sample comprises a plurality of particles and the property of the sample and/or the input parameter comprises the fluorescence of the plurality of particles, the absorption of the plurality of particles, the average particle size of the plurality of particles, the concentration of the plurality of particles within the sample, the monodispersity of the plurality of particles, or a combination thereof; or
the sample comprises an organic molecule and the property of the sample and/or the input parameter comprises the fluorescence of the organic molecule, the absorption of the organic molecule, the identity of the organic molecule, the concentration of the organic molecule within the sample, or a combination thereof.

18. A method for the preparation of a sample, the method comprising:
contacting a first precursor with a second precursor thereby forming a fluid precursor sample;
injecting the fluid precursor sample into the sample inlet of the device of claim 1;
continuously flowing the fluid precursor sample from the sample inlet to the sample outlet, wherein the first precursor reacts with the second precursor as the fluid precursor sample continuously flows from the sample inlet to the sample outlet to form the sample before reaching the sample outlet; and
collecting the sample at the sample outlet;
wherein the sample has a property and wherein the sample comprises a plurality of particles or an organic molecule; and
wherein the method further comprises optimizing the synthesis conditions to achieve the property using the device of claim 1.

19. A method for the preparation of a sample in a continuous flow device, the continuous flow device comprising:
a sample conduit providing a path for continuous fluid flow from a sample inlet to a sample outlet;
a thermal housing enclosing the sample conduit, wherein the thermal housing comprises a plurality of measurement regions;
a detector configured to capture a spectroscopic signal from the sample conduit at one of more of the plurality of measurement regions; and
a motorized stage translatable along the thermal housing from a first location to a second location;
wherein the detector is coupled to the motorized stage such that the motorized stage is configured to translate the detector along the thermal housing to align the detector with one or more of the plurality of measurement regions;
the method comprising:
a. contacting an amount of a first precursor with an amount of a second precursor thereby forming a fluid precursor sample;
b. injecting the fluid precursor sample at a first flow rate into the sample inlet of the continuous flow device while the thermal housing has a first temperature;

c. continuously flowing the fluid precursor sample from the sample inlet to the sample outlet, wherein the first precursor reacts with the second precursor as the fluid precursor sample flows from the sample inlet to the sample outlet to form the sample before reaching the sample outlet;

d. capturing a spectroscopic signal from the sample within the sample conduit at a first measurement region;

e. analyzing the spectroscopic signal to determine a property of the sample;

f. comparing the spectroscopic signal and/or the property to an input parameter;

g. when the input parameter is different than the spectroscopic signal and/or the property, then:
   translating the motorized stage along the thermal housing to a second measurement region and repeating steps d-f at the second measurement region;
   adjusting the amount of the first precursor, the amount of the second precursor, the temperature of the thermal housing, the first flow rate, or a combination thereof, and repeating steps a-f;
   or a combination thereof;
and h. when the input parameter and the spectroscopic signal and/or the property are the same, then: collecting the sample at the sample outlet.

20. The method of claim 19, wherein:
the sample comprises a plurality of particles and the property of the sample and/or the input parameter comprises the fluorescence of the plurality of particles, the absorption of the plurality of particles, the average particle size of the plurality of particles, the concentration of the plurality of particles within the sample, the monodispersity of the plurality of particles, or a combination thereof; or the sample comprises an organic molecule and the property of the sample and/or the input parameter comprises the fluorescence of the organic molecule, the absorption of the organic molecule, the identity of the organic molecule, the concentration of the organic molecule within the sample, or a combination thereof.

* * * * *